(12) United States Patent
Bloss

(10) Patent No.: US 12,047,454 B2
(45) Date of Patent: Jul. 23, 2024

(54) ADAPTIVE TOWER MONITORING AND AUTHENTICATION CONTROL

(71) Applicant: DISH Wireless L.L.C., Englewood, CO (US)

(72) Inventor: Warren Bloss, Castle Rock, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 17/064,799

(22) Filed: Oct. 7, 2020

(65) Prior Publication Data

US 2022/0109729 A1    Apr. 7, 2022

(51) Int. Cl.
| | |
|---|---|
| *H04L 67/125* | (2022.01) |
| *G16Y 20/10* | (2020.01) |
| *G16Y 40/10* | (2020.01) |
| *G16Y 40/20* | (2020.01) |
| *G16Y 40/35* | (2020.01) |
| *H04L 67/12* | (2022.01) |

(52) U.S. Cl.
CPC ............ *H04L 67/125* (2013.01); *G16Y 20/10* (2020.01); *G16Y 40/10* (2020.01); *G16Y 40/20* (2020.01); *G16Y 40/35* (2020.01); *H04L 67/12* (2013.01)

(58) Field of Classification Search
CPC ....... H04L 67/12; H04L 67/125; G16Y 20/10; G16Y 40/10; G16Y 40/20; G16Y 40/35
See application file for complete search history.

(56) References Cited

U.S. PATENT DOCUMENTS

| 9,251,472 B1 * | 2/2016 | Linowes .................. F24F 11/49 |
| 2013/0238145 A1 * | 9/2013 | Hammer ............. G01F 23/0023 |
| | | 700/279 |

(Continued)

OTHER PUBLICATIONS

Geng Xin and Hu Xiaoguang, "On-line monitoring method and observation system of transmission line icing," 2009 4th IEEE Conference on Industrial Electronics and Applications, Xi'an, 2009, pp. 1265-1269.*

(Continued)

*Primary Examiner* — Jason D Recek
(74) *Attorney, Agent, or Firm* — Kilpatrick Townsend & Stockton LLP

(57) ABSTRACT

System, method, and non-transitory machine-readable media to facilitate adaptive monitoring and authentication control for a premises on which a raised structure is located are disclosed. First sensor-based data received from first sensors may be processed, consequent to the first sensors detecting phenomena on or around a raised structure. A particularized specification of recognized patterns mapped to a first location may be adaptively developed, the particularized specification of the recognized patterns including recognized patterns of sensor input from the first sensors. Second sensor-based data that is based on the first sensors may be processed. A mismatch of the second sensor-based data with respect to the particularized specification of the recognized patterns mapped to the first location may be detected. Activation adjustments in operation of one or both of the first sensors and second sensors may be selectively caused, and subsequent sensor-based data may be collected based on the activation adjustment.

20 Claims, 6 Drawing Sheets

(56) References Cited

U.S. PATENT DOCUMENTS

| | | | |
|---|---|---|---|
| 2016/0188757 A1* | 6/2016 | Gonzalez-Banos | G06F 17/11 |
| | | | 703/1 |
| 2018/0293864 A1* | 10/2018 | Wedig | G08B 21/182 |
| 2019/0013101 A1* | 1/2019 | Johnson | H04L 12/2825 |
| 2020/0089885 A1* | 3/2020 | Kling | H04L 63/1441 |
| 2020/0213146 A1* | 7/2020 | Kodam | G06F 21/32 |

OTHER PUBLICATIONS

Zhen et al. "Transmission Tower Protection System Based on Internet of Things in Smart Grid", 2012 7th IEEE International Conference on Computer Science & Education, Jul. 2012, pp. 863-867.*

* cited by examiner

ADAPTIVE TOWER MONITORING AND AUTHENTICATION CONTROL

This disclosure generally relates to Internet of Things (IoT), and more particularly to facilitating adaptive tower monitoring and authentication control.

BACKGROUND

The development of IoT devices and associated applications and services may be a complex proposition. Fully realizing the potential for IoT devices in various applications may present a number of challenges and problems involving field devices, edge devices, network operations/management software, security, device management, and more. There is a need for systems, devices, and methods that address the challenges and problems encumbering development and deployment of IoT devices and that provide for more particularized and useful features. This and other needs are addressed by the present disclosure.

BRIEF SUMMARY

Certain embodiments of the present disclosure relate generally to IoT, and more particularly to facilitating tower monitoring and authentication control.

In one aspect, a system to facilitate adaptive monitoring and authentication control for a premises on which a raised structure is located is disclosed. The system may include one or more processing devices and memory communicatively coupled with and readable by the one or more processing devices and having stored therein machine-readable instructions which, when executed by the one or more processing devices, cause the one or more processing devices to perform operations. The operations may include one or a combination of the following. First sensor-based data received from a first set of one or more sensors may be processed, consequent to the first set of one or more sensors detecting phenomena on or around a raised structure, the first sensor-based data corresponding to the detected phenomena. A particularized specification of one or more recognized patterns mapped to a first location may be adaptively developed based at least in part on processing the first sensor-based data, the particularized specification of the one or more recognized patterns including one or more recognized patterns of sensor input from the first set of one or more sensors. Second sensor-based data that is based at least in part on the first set of one or more sensors may be processed, consequent to the first set of one or more sensors detecting additional phenomena on or around the raised structure, the second sensor-based data corresponding to the detected additional phenomena. A mismatch of the second sensor-based data with respect to the particularized specification of the one or more recognized patterns mapped to the first location may be detected. Consequent to the detection of the mismatch, one or more activation adjustments in operation of one or both of the first set of one or more sensors and a second set of one or more sensors communicatively coupled to the adaptive control device may be selectively caused, and subsequent sensor-based data may be collected based at least in part on the one or more activation adjustments.

In another aspect, one or more non-transitory, machine-readable media are disclosed, the one or more non-transitory, machine-readable media having machine-readable instructions thereon which, when executed by one or more processing devices, cause the one or more processing devices to perform operations. The operations may include one or a combination of the following. First sensor-based data received from a first set of one or more sensors may be processed, consequent to the first set of one or more sensors detecting phenomena on or around a raised structure, the first sensor-based data corresponding to the detected phenomena. A particularized specification of one or more recognized patterns mapped to a first location may be adaptively developed based at least in part on processing the first sensor-based data, the particularized specification of the one or more recognized patterns including one or more recognized patterns of sensor input from the first set of one or more sensors. Second sensor-based data that is based at least in part on the first set of one or more sensors may be processed, consequent to the first set of one or more sensors detecting additional phenomena on or around the raised structure, the second sensor-based data corresponding to the detected additional phenomena. A mismatch of the second sensor-based data with respect to the particularized specification of the one or more recognized patterns mapped to the first location may be detected. Consequent to the detection of the mismatch, one or more activation adjustments in operation of one or both of the first set of one or more sensors and a second set of one or more sensors communicatively coupled to the adaptive control device may be selectively caused, and subsequent sensor-based data may be collected based at least in part on the one or more activation adjustments.

In yet another aspect, a method for adaptive monitoring and authentication control for a premises on which a raised structure is located is disclosed. The method may include one or a combination of the following. First sensor-based data received from a first set of one or more sensors communicatively coupled to an adaptive control device may be processed by an adaptive control device, consequent to the first set of one or more sensors detecting phenomena on or around a raised structure, the first sensor-based data corresponding to the detected phenomena. A particularized specification of one or more recognized patterns mapped to a first location may be adaptively developed by the adaptive control device based at least in part on processing the first sensor-based data, the particularized specification of the one or more recognized patterns including one or more recognized patterns of sensor input from the first set of one or more sensors. Second sensor-based data that is based at least in part on the first set of one or more sensors may be processed by the adaptive control device, consequent to the first set of one or more sensors detecting additional phenomena on or around the raised structure, the second sensor-based data corresponding to the detected additional phenomena. A mismatch of the second sensor-based data with respect to the particularized specification of the one or more recognized patterns mapped to the first location may be detected by the adaptive control device. Consequent to the detection of the mismatch, one or more activation adjustments in operation of one or both of the first set of one or more sensors and a second set of one or more sensors communicatively coupled to the adaptive control device may be selectively caused by the adaptive control device, and subsequent sensor-based data may be collected based at least in part on the one or more activation adjustments.

In various embodiments, the one or more activation adjustments may include modifying one or more operational settings of one or both of the first set of one or more sensors and the second set of one or more sensors. In various embodiments, the particularized specification of the one or more recognized patterns mapped to the first location may correspond to a recognition of one or more of an individual, an object, or an aspect of the raised structure or of a premises on which the raised structure is located. In various embodiments, a set of one or more identification rules specified by the particularized specification of the one or more recognized patterns stored by the adaptive control device may be accessed, the set of one or more identification rules including criteria for identifying sensed individuals, where the particularized specification of the one or more recognized patterns mapped to the first location corresponds to a recognition of at least one individual and is mapped to an identifier of the at least one individual. The detecting the mismatch of the second sensor-based data with respect to the particularized specification of the one or more recognized patterns mapped to the first location may be based at least in part on analyzing the second sensor-based data using the identification rules to determine that the second sensor-based data corresponds to an insufficient identification of an individual.

In various embodiments, the particularized specification of the one or more recognized patterns mapped to the first location and mapped to an identifier of the at least one individual may be stored. In various embodiments, subsequent sensor-based data from one or both of the first set of one or more sensors and the second set of one or more sensors consequent to the one or more activation adjustments may be received. A communication may be transmitted to an endpoint device and/or an account associated with a user to facilitate authenticated access to the first sensor-based data, the second sensor-based data, and/or the subsequent sensor-based data consequent to authentication of the endpoint device and/or the account associated with the user. In various embodiments, the communication may include an indication of the insufficient identification. One or more user selections corresponding to one or more user-selection options may be processed, the one or more user selections responsive to the communication. The individual may be authenticated based at least in part on the one or more user selections. In various embodiments, the processing the second sensor-based data may include determining a particular location of the additional phenomena, and the one or more activation adjustments may be a function of the particular location. In various embodiments, a movement in the first location may be determined based at least in part on the second sensor-based data, where the one or more activation adjustments may be a function of the movement. In various embodiments, the one or more activation adjustments may be based at least in part on the adaptive control device anticipating additional movement in a second location subsequent to the movement corresponding to the first location.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Figure 1:
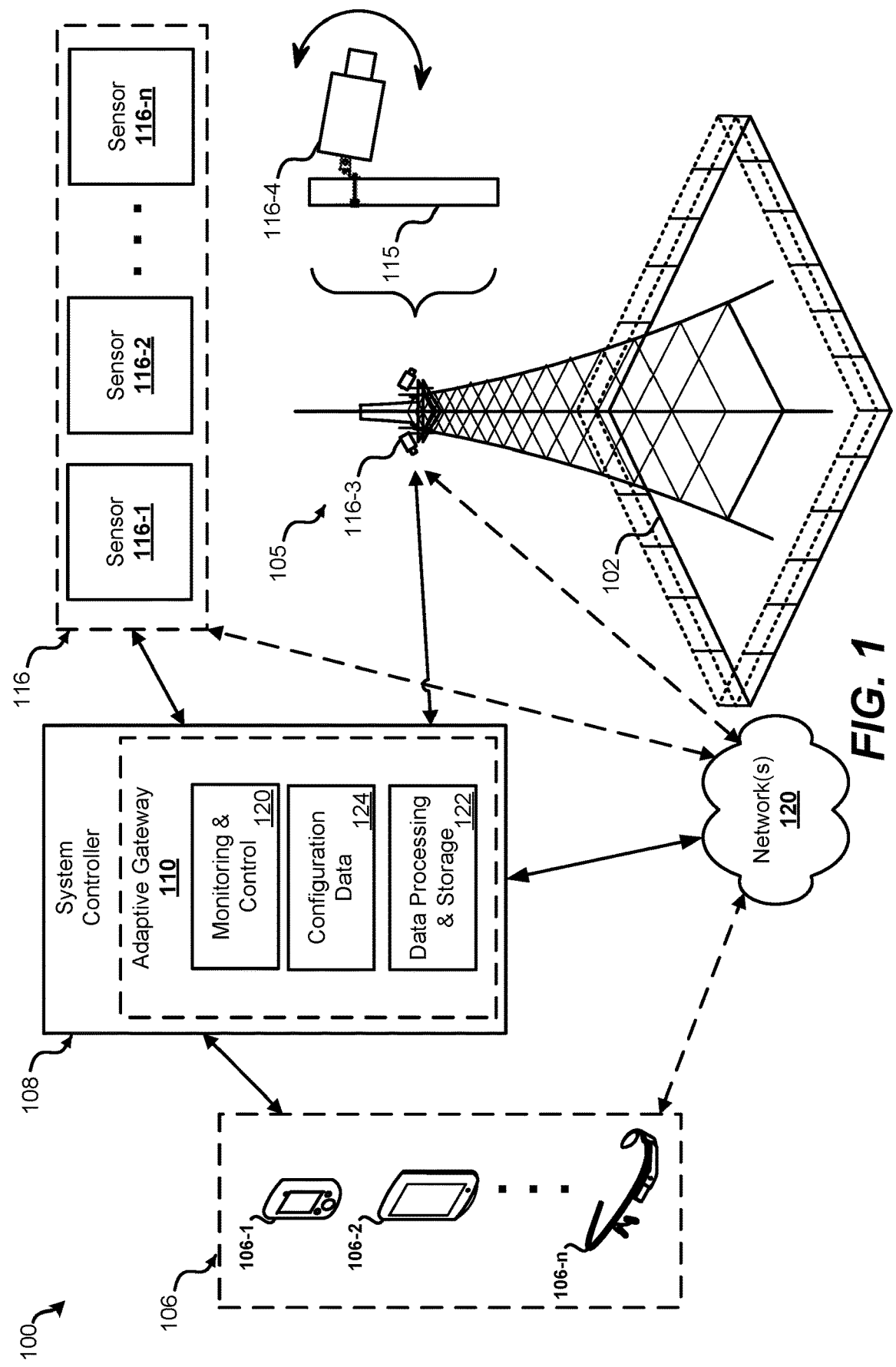
FIG. 1 illustrates an overview of a system to facilitate adaptive monitoring and authentication control, in accordance with disclosed embodiments of the present disclosure.

Various embodiments will now be discussed in detail with reference to the accompanying figures, beginning with FIG. 1. FIG. 1 illustrates a diagram of an overview of an embodiment of a system 100 to facilitate adaptive tower monitoring and authentication control, in accordance with embodiments of present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific.

The system 100 may correspond to embodiments for adaptive monitoring and authentication for a premises 102 on which a raised structure 105 is located. By way of example, system 100 illustrates a tower structure 105 that may correspond to a cellular tower, radio tower, another type of telecommunications tower, or any other raised structure, and may have any suitable configuration and dimensions. A variety of configurations of the tower structure 105 may be employed to facilitate embodiments of this disclosure. The premises 102 may correspond to any suitable site on which a raised structure 105 may be located. Such sites may be in a variety of locations and may be relatively remote, for example, on mountains, hills, fields, skyscrapers, etc. Oftentimes, the premises 102 may include any suitable fence, wall, or the like surrounding at least a portion of the premises 102 to create a security perimeter about the site.

The system 100 may include a system controller 108 that may be or include an adaptive control device. The system controller 108 may be configured to communicate with multiple sensors 116. For example, the system controller 108 may be configured to receive sensor data from one or more sensors and/or sensor systems 116. Such communication may use different communication standards or protocols. The system controller 108 may be configured to provide signals for controlling one or more device controllers, which may be control units and/or systems configured to control one or more of the sensors 116. The device controllers may be integrated with, or otherwise communicatively coupled to, one or more corresponding devices under control 116. The system controller 108 may provide a link, when necessary, between the communication protocol used by the device controllers and the communication protocol used by an interface 116. In some embodiments, this may be a bridge between Zigbee and Wi-Fi, for example. In certain embodiments, the system controller 108 may include a monitoring and control module 120. In some embodiments, the system controller 108 may be directly connected or coupled to one or more control units and/or sensors 116. Sensors and control units may be wired or wirelessly coupled to the system controller 108. Sensors and control units may be coupled and connected in a serial, parallel, star, hierarchical, and/or the like topologies and may communicate to the television receiver via one or more serial, bus, or wireless protocols and technologies which may include, for example, Wi-Fi, CAN bus, Bluetooth, I2C bus, ZigBee, Z-Wave and/or the like.

In some embodiments, the system 100 may include one or more monitoring/control modules 120 which could be external to the system controller 108. In some embodiments, the system controller 108 may interface to one or more sensors and control units via one or more monitoring/control modules 120. The external monitoring/control modules 120 may be wired or wirelessly coupled to the system controller 108. In some embodiments, the monitoring/control module 120 may connect to the system controller 108 via a communication port such as a USB port, serial port, and/or the like. In some embodiments, the monitoring/control module 120 may connect to the system controller 108 via a wireless communication protocol such as Wi-Fi, Bluetooth, Z-Wave, ZigBee, and/or the like. The external monitoring/control module may include a separate device that may be positioned near the system controller 108 or may be in a different location, remote from the system controller 108. In various embodiments, one or more system controllers 108 may be disposed on the same premises 102 as all or a subset of the one or more sensors 116, one or more device controllers 126, and/or devices 136, and/or may be located remotely off the premises 102. In some embodiments, one or more system controllers 108 may be communicatively coupled to all or a subset of the one or more sensors 116 and/or one or more device controllers via the one or more networks 120 and a server system in the cloud.

Monitoring and control module(s) 120 may be communicatively coupled to components such as sensors 116. Sensors 116 may include any one or combination of cameras, infrared detectors, motion sensors, sound sensors/microphones, proximity sensors, vibrational sensors, wind/weather sensors, seismic sensors, temperature sensors, humidity sensors, weight sensors, and/or the like. For example, one or more sensors 116 may include one or more cameras configured to have a field of view that may detect phenomena in proximity to the one or more sensors 116, i.e., phenomena on or around the tower structure 105, the premises 102, and/or the perimeter and/or enclosure/fence thereof.

In various embodiments, sensors 116 may be disposed in various locations on or around the raised structure 105, the premises 102, and/or the perimeter, enclosure/fence about the perimeter, on posts, support members, and/or other components thereof. For example, one or more sensors 116 may be attached to the tower structure 105. The tower structure 105 may have one or more support members 115 attached at one or more suitable points of the tower structure 105 in any suitable manner. A support member 115 may have any suitable dimensions, materials, and characteristics. As illustrated, a camera 116 (e.g., or any other suitable sensor 116) may be mounted on the tower structure 105, for example, by way of a support member 115. The camera 116 may include one or more device controllers configured to make operational adjustments of one or more actuators of the camera 116 configured to adjust pan, tilt, and/or zoom/focus of the camera 116. Such device controllers may include one or more processors, memory, and other components disclosed herein and may be configured to automatically adjust the camera 116. Additionally, such device controllers may be communicatively coupled to, and remotely controllable by, the system controller 108 and/or one or more administratory devices 106 as disclosed herein. The camera 116, being mounted on one side of the tower structure 105, may only have a limited range of view about the tower structure 105. In some embodiments, a set of two or more cameras 116 may be disposed about the tower 105 such that the set of cameras 116 may be cooperatively controlled to provide a wider range of view about the tower structure 105 (e.g., a 360° range about the tower 105, with or without pan and/or tilt adjustments according to various embodiments). Various embodiments of the system 100 may include multiple sets of one or more sensors 116, e.g., two, three, four, ten, or many more sets of one or more sensors. In some embodiments, one or more sensors 116 may be part of a device under control and/or a device controller corresponding to the device under control.

Likewise, other types of sensors 116 may be disposed on or around the tower structure 105, the premises 102, and/or the perimeter and/or enclosure/fence thereof. For example, one or a combination of infrared detectors, motion sensors, sound sensors/microphones, proximity sensors, vibrational sensors, wind/weather sensors, seismic sensors, temperature sensors, humidity sensors, weight sensors, and/or the like may be mounted on the tower structure 105 and may be remotely controllable. Additionally or alternatively, for example, one or a combination of such sensors may be mounted on the enclosure/fence and/or at any other suitable location and/or structure on or about the premises 102. For example, in various embodiments, the one or more sensors 116 may be configured to capture images and/or other indicia of premises and/or tower states, such as any one or combination of ambient temperature proximate to the tower 105, movement on the premises 102; image changes of the premises 102 as a function of time (e.g., to recognize changing weather conditions, snow accumulation, and/or the like), vibrations of the tower 105 and/or the fence, and/or the like. As disclosed herein, the system controller 108 may process and analyze such sensor data to determine any one or combination of premises and/or tower states as a function of time and develop particularized premises and/or tower states profiles that chronicle the states of the particular premises and/or tower states.

In some embodiments, monitoring and control module(s) 120 may be communicatively coupled to components such as device controllers configured to control sensors 116. Device controllers may include any number of switches, solenoids, solid state devices and/or the like configured for controlling (e.g., communicating with, adjusting setting of, activating, deactivating, initiating processes, and/or the like) sensors 116, turning on/off and otherwise adjusting settings of electronics, and/or the like. One or more of the device controllers may be configured to be able to send control commands to sensors 116. In various embodiments, one or more of the device controllers may be part of other devices and/or systems or may be communicatively coupled with other devices and/or systems but physically separate therefrom. In some embodiments, the device controllers of a system may be controlled via a communication or control interface of the system. For example, the sensor settings may be configurable and/or controlled via a communication interface of the sensor 116. The sensors 116 and/or device controllers may be individually and uniquely identifiable. One or more of the sensors 116 and/or device controllers may be combined into assemblies or units with multiple sensing capabilities and/or control capabilities. A single module may include, for example, a temperature sensor and a motion sensor, another module may include an image sensor and a control unit, etc.

A plurality of sensors 116 may include different types of sensors 116, each different type of sensor 116 configured to detect a different type of phenomena and/or generate a different type of data based on the detected phenomena. Thus, a multiplicity of integrated and/or non-integrated sensors 116 may be configured to capture phenomena at a single premises 102 that may include one or more raised structures 105 in order to identify aspects of the premises 102, premises states, raised structures 105 and corresponding states, one or more conditions at the premises 102, objects and individuals at the premises 102, and/or the environment proximate to the premises 102, e.g., to facilitate any one or combination of image recognition, location detection, vibration sensing, seismic sensing, temperature sensing, infrared impressions, heat impressions, movement recognition, and/or the like. In various embodiments disclosed herein, features are disclosed with respect to capturing, analyzing, transmitting, and causing presentation of images with respect to premises 102 and structures 105. Such image features are to be understood as involving, utilizing, and providing singular images and/or a plurality of images such as video in various embodiments, even though video may not be explicitly discussed in reference to specifics of such image features. Data captured from such sensors 116 may be used in identification and adaptive monitoring and authentication processes disclosed herein.

During operation of the system 100, readings from the sensors may be collected, processed, stored, analyzed, modified, and augmented in the system controller 108. In certain embodiments, analysis of the sensors and control of the control units may be determined with configuration data 124 stored in the system controller 108. The configuration data 124 may define how the sensor data is collected, how often, what periods of time, what accuracy is required, what resolution is required, and other characteristics. The configuration data 124 may specify specific sensor and/or control unit settings for a monitoring and/or control application. The configuration data 124 may define how the sensor readings are processed, analyzed, and/or utilized. For example, for some applications, sensor analysis may include collecting sensor readings and performing time-based analysis to determine trends. For other applications, sensor analysis may include monitoring sensor readings to determine if a threshold value of one or more sensor readings has been reached. The function of the system 100 may be determined by loading and/or identifying configuration data 124 for an application. In some embodiments, the system 100 may be configured for more than one monitoring or control operation by selecting or loading the appropriate configuration data 124. Configuration data 124 may define monitoring operations, reactive measures, activation constraints for components of the system, and/or the like.

Readings processed by the monitoring and control modules 120 may be logged and analyzed by the data processing and storage module 122. The data processing and storage 122 module may analyze the received data and generate control signals, schedules, and/or sequences for controlling components. The data processing and storage module 122 may, for example, receive sensor data from image sensors 116, motion sensors 116, vibration sensors 116, and/or the like.

The system controller 108 may be configured to manage one or more other components of the system that communicatively coupled to the system controller 108 via any suitable means, including wired and/or wireless connections. The system controller 108 may be communicatively coupled to one or more control and/or notification interfaces 106. In some embodiments, control may be allowed from multiple devices from premises 102 interfacing to the system controller 108. With some embodiments, the system 100 may allow control from outside of the premises 106 by way of a control interface 106, in which case control is likely to be routed by way of the one or more networks 120 and servers in the cloud. In some embodiments, one or more interfaces 106 may be capable of user notification, showing the status, configuration data, and/or the like. The system controller 108 may provide a user interface (e.g., via an interface 106) to allow for output of information to a user and for input from user with one or more user-selectable interface elements. In various embodiments, an end-user interface may include providing one or more display screens that may each include one or more user interface elements. An end-user interface may include any text, image, and/or device that can be displayed on a display screen for providing information to a user and/or for receiving user input. An end-user interface may include one or more icons, widgets, buttons, checkboxes, text, text boxes, text fields, tables, lists, and/or the like. The one or more interfaces 106 may be devices that are directly or indirectly connected to the system controller 108 and may receive information, such as notifications, from the system controller 108.

The system controller 108 may provide one or more administrative control interfaces 106 that may include a computing device configured with a control application. In various embodiments, the interfaces 106 may include and/or be accessed via one or more endpoint devices such as various computerized devices that may be associated with a user in the system 100 and that may be configured to facilitate various surfacing of content features, providing user-selectable interface elements, and allowing of user input features as disclosed in various embodiments herein. As indicated, the computing devices may include a laptop computer, a cellular phone and/or smartphone, a tablet computer, smart glasses, a smart watch, or another similar form of wearable computing device or another similar form of mobile device. In some embodiments, the computing devices 106 may include a desktop computer, a kiosk, a television receiver directly or indirectly coupled to one or more display devices, such as a television or a monitor, a set-top box (which may include a television receiver, in some embodiments), a television (which may include a television receiver, in some embodiments), and/or the like. An administratory interface 106 may include one or a combination of the features of the other interfaces 106, such as one or more icons, widgets, buttons, checkboxes, text, text boxes, text fields, tables, lists, and/or the like interface elements. In various embodiments, the administratory interfaces 106 may correspond to one or more server systems, computer systems, databases, websites, portals, any repositories of data in any suitable form, and/or the like that facilitate the administratory access over the components of the system 100, allowing administratory access all or portions of the components specifications, configurations, settings, thresholds, diagnostics, operations, corresponding content features disclosed herein, and/or the like. The computing devices 106 may provide access credentials to the system controller 108 in order for the system controller 108 allow authenticated access to content and features accessible through the system controller 108. The administratory interface 106 may be further configured to provide administratory access to the system controller 108, the sensors 116, and/or device controllers. For example, administratory access may allow setting and/or override of adjustment features disclosed herein, adding and removing sensors 116, generating one or more operational interrupts to interrupt operations of the sensors 116 and/or the device controllers 136, adjust one or more thresholds for adjustments 382, and/or the like. As another example, the system controller 108 may be configured to provide rolling windows of sensor-captured phenomena to be exposed via an administratory device 106 for a period of time before a triggering event and after the triggering event. It should be understood that the computing devices 106 are exemplary in nature. Access may be provided through a fewer or greater number of computerized devices 106 communicatively couplable with the system controller 108.

Figure 2:
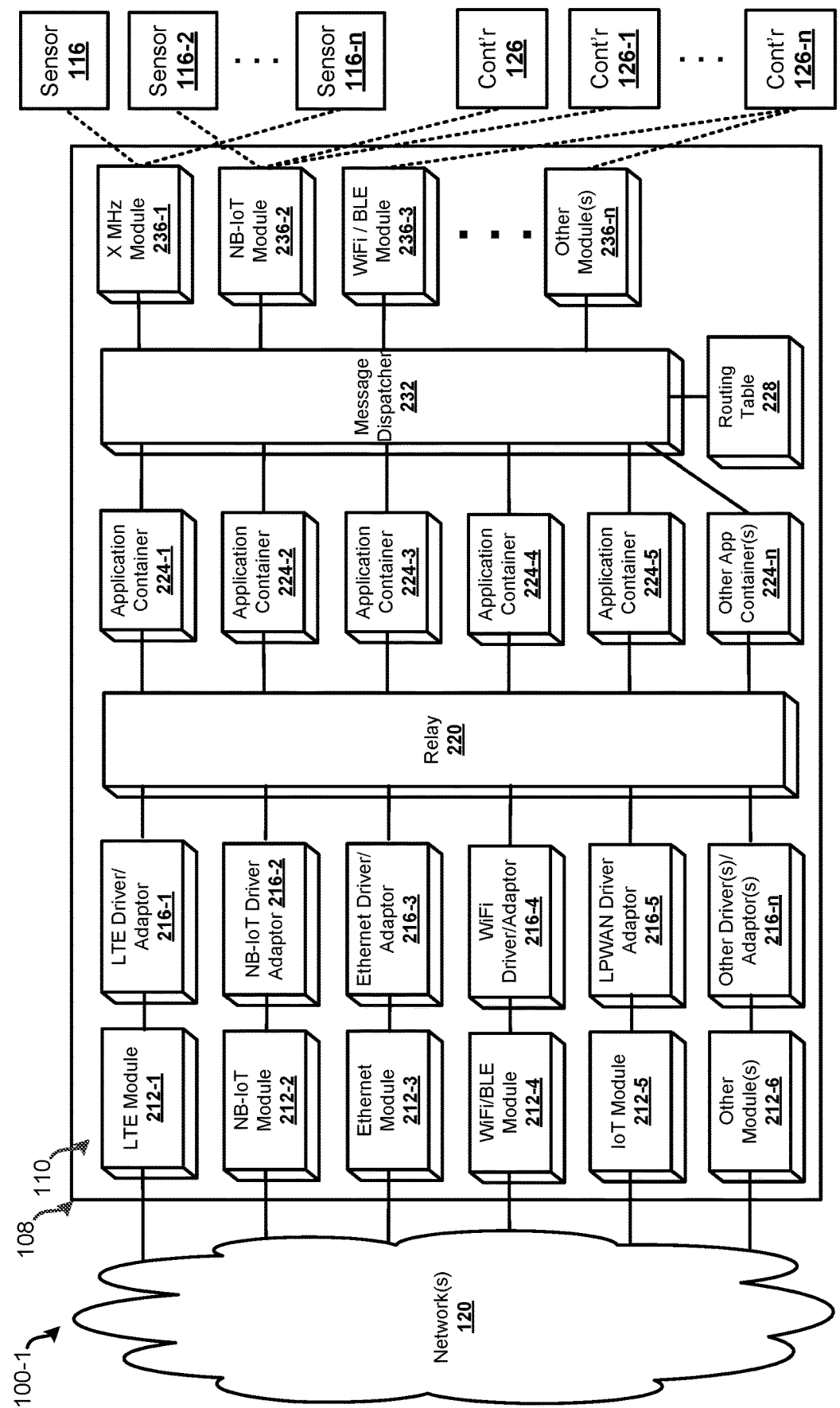
FIG. 2 illustrates certain aspects of the system, in accordance with disclosed embodiments of the present disclosure.

FIG. 2 illustrates certain aspects of the system 100-1, in accordance with embodiments of the present disclosure. As illustrated in FIGS. 1 and 2, the system controller 108 may include an adaptive gateway 110. In some embodiments, the system controller 108 may not include an adaptive gateway 110 but may be communicatively coupled therewith. The adaptive gateway 110 may be a separate media device that is distinct from, and communicating with, one or more IoT devices according to an IoT network protocol. For example, the adaptive gateway 110 may communicate with one or more sensor devices 116 within range of the adaptive gateway 110 wireless communications links. In various embodiments, the adaptive gateway 110 may facilitate communication of the one or more sensor devices 116 via the networks 120 and may also facilitate communication of multiple sensor devices 116 with each other by forming, for example, a LAN, a WAN, a HAN, a WLAN, and/or the like at various localities.

In some embodiments, the adaptive gateway 110 may include a Layer 3 network gateway device. In some embodiments, the adaptive gateway 110 may provide a bridge from one or more sensor devices 116 to a 5G wireless network of the networks 120. The adaptive gateway 110 may include any suitable routers, switches, modems, wireless transceivers, wired ports, etc., one or more processors, and input-output (I/O) interfaces, and one or more types of memory, with an operating system and instructions stored in non-transitory memory such that the adaptive gateway 110 may be configured to function as a special-purpose computer to provide the intelligent sensor control features in accordance with various embodiments disclosed herein. The adaptive gateway 110 may differentiate and indicate different types of traffic, and intelligently route traffic suitable for a next-generation network (e.g., 5G wireless network and beyond), as well as other traffic.

The adaptive gateway 110 may be configured to communicate with a plurality of sensor devices 116, identify received transmissions from the sensor devices 116 in particular types of protocols, and then route the different types of packets differently, with prioritization and different network slicing based at least in part on one or a combination of types of sensor devices 116, sensor data, network technologies, and/or packet types. In various embodiments, the adaptive gateway 110 may be configured to receive a multiplicity of transmissions according to a multiplicity of communications protocols that may corresponding to one or a combination of any suitable radio frequency communications, Wi-Fi, Bluetooth (BLE), LTE, 5G, 4G, communications per the NBIOT standard, next-generation wireless networks such as video per the ATSC 3.0 standard, and/or the like. In various embodiments, the adaptive gateway 110 may be configured with a variety of different modules 212, 236 to manage a variety of different networks of sensor devices 116 and/or may self-configure by downloading different modules 212, 236 and/or applications 224 responsive to detecting a particular sensor device 116 and determining the corresponding sensor type and module 212, 236 and/or application 224 needed for communication with the particular sensor device 116. Accordingly, the adaptive gateway 110 may be configured to include communication interface modules 236. The communication interface modules 236 may correspond to IoT modules that may, for example, include radio modules that plug into slots within the adaptive gateway 110 and host a local-area-network (LAN) over an RF interface. For example, the communication interface modules 236 may include a certain RF frequency module 236-1 (various embodiments may provide for various numbers of channels and channel ranges), a NBIOT module 236-2, a WiFi/BLE module 236-3, and/or the like modules (LTE, 5G, 4G, various low-power wide-area network modules, etc.) corresponding to one or more of the multiplicity of communications protocols. The adaptive gateway 110 may include one or more relays 220, drivers/adaptors 216, and modules 212 that facilitate transfer of data from applications 224 to the system controller 108 and vice versa. The drivers/adaptors 216 may include the software necessary to operate the different interfaces and corresponding modules 212 specifically configured for the particular network connections (e.g., LTE, 5G, 4G, NBIOT, Ethernet, WiFi, LPWAN, and/or the like).

The communications interfaces corresponding to the communication interface modules 236 and/or 212 may, for example, be capable of transmitting and receiving information wirelessly through both short range, radio frequency (RF), cellular, Wi-Fi, and/or the like connections. The communications interfaces may, for example, provide a near field communication interface (e.g., Bluetooth, optical interface, infrared interface, etc.) and/or wireless communications interfaces capable of communicating through a cellular network, Wi-Fi, and/or the like. In various embodiments, the communications interfaces may correspond to a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like in the adaptive gateway 110. The communication interface(s) corresponding to the communication interface module(s) 236 and/or 212 may include at least one antenna for wireless data transfer according to the communications protocol(s). For example, the antenna may include a cellular antenna (e.g., for sending and receiving cellular data communication, such as through a network such as a 3G, 4G, or 5G network).

The application layer communications of the adaptive gateway 110 may support a command/response protocol, where commands are messages that instruct a device or application to take some action, and responses are messages that return the result of the command message. These messages may begin with a command byte and may be followed by one or more bytes of data. The adaptive gateway 110 may include a message dispatcher 232 configured to manage traffic to and from the different sensor devices 116. The message dispatcher 232 and the modules 236 may be communicatively connected by way of one or more serial communication links. The message dispatcher 232 may, for example, manage communications between the modules 236 and applications 224. The different applications 224 that reside on the adaptive gateway 110 may consume data generated by corresponding sensor devices 116. The message dispatcher 232 may interconnect the various applications 224 to the various modules 236. While in some embodiments the various components (e.g., modules 212, modules 236, drivers and adaptors 216, relay 220, applications 224, message dispatcher 232, etc.) may be separate and distinct as illustrated, one or more of the components may be integrated in various embodiments. The message dispatcher 232 may direct traffic and route communications between the applications 224 and modules 236.

Over the lifecycle of the adaptive gateway 110, the routing table 228 may be populated as devices are plugged in. For example, when a module 236 is plugged in and the adaptive gateway 110 is powered up, the adaptive gateway 110 may discover the module 236 and may create one or more entries in the routing table 228. When a user interface is exposed to endpoints to add one or more sensor devices 116, the adaptive gateway 110 may add identification, specification, and authorization information for those sensor devices 116 to the routing table 228 so the message dispatcher 232 may subsequently understand that a particular application 224 is authorized to communicate with a sensor device 116 connected to a particular module 236 and the routing table 228 may provide the routing for the communications. For example, after an entry is added in the routing table 228 to define a route from a particular sensor device 116 and/or module 236 to a particular application 224 (and vice versa), the message dispatcher 232 may use the routing table 228 to identify a received message target. In various embodiments, the sender may provide its ID with or without a target ID, and the message dispatcher 232 may verify the authenticated routed and then transfer the message.

In some embodiments, each module 236 may maintain a list with assigned slot numbers and unique IDs of the sensor devices 116 with which the module 236 communicates. Every time the sensor device 116 communicates, the module 236 may use the list to authenticate the communication. The module 236 may determine whether it recognizes the sensor device 116 sending the communication and whether the sensor device 116 is communicating within a correct time slot to which the sensor device 116 is assigned. Once the communication is authenticated, the module 236 may pass the communication to the application 224 that is to consume the data from the sensor device 116. In alternative embodiments, the message dispatcher 232 may maintain a whitelist (e.g., in the routing table 228) for all the sensor devices 116 and may perform the communication authentications.

In various embodiments, one or more methods employed by the adaptive gateway 110 to control orchestration of sensor devices 116 and devices 106 over one or more networks 120 may include broadcast communications, receiving and processing sensor device responses, and assigning time intervals. For example, the adaptive gateway 110 may broadcast a first electronic on one or more channels of a plurality of different channels, where the first electronic broadcast is broadcasted in a first time slot of a time interval. The adaptive gateway 110 may receive and process an electronic response from a first sensor device 116 in response to the broadcasting of the first electronic broadcast, where the electronic response from the first sensor device is received in a second time slot of the time interval. The adaptive gateway 110 may transmit an electronic communication to the first sensor device 116, the electronic communication transmitted in a third time slot of the time interval and including an indication of an assignment of a fourth time slot of the time interval to the first sensor device 116.

In various embodiments, the one or more methods may include establishing connections with device controllers 126 and user devices 106 with broadcast communication, receiving and processing mobile device responses, and assigning time intervals. For example, the adaptive gateway 110 may broadcast a second electronic broadcast on one or more channels of the plurality of different channels, where the second electronic broadcast is broadcasted in a fifth time slot of the time interval. The adaptive gateway 110 may receive and process an electronic response from a first device controller 126 in response to the broadcasting of the second electronic broadcast, where the electronic response from the first device controller 126 is received in a sixth time slot of the time interval. The adaptive gateway 110 may transmit an electronic communication to the first device controller 126, the electronic communication transmitted in a seventh time slot of the time interval and including an indication of an assignment of an eighth time slot of the time interval to the first device controller 126. The adaptive gateway 110 may broadcast a third electronic broadcast on one or more channels of the plurality of different channels, where the third electronic broadcast is broadcasted in a ninth time slot of the time interval. The adaptive gateway 110 may receive and process an electronic response from a first device 106 in response to the broadcasting of the third electronic broadcast, where the electronic response from the first device 106 is received in a tenth time slot of the time interval. The adaptive gateway 110 may transmit an electronic communication to the first device 106, the electronic communication transmitted in an eleventh time slot of the time interval and including an indication of an assignment of a twelfth time slot of the time interval to the first device 106.

In various embodiments, the one or more methods may include controlling the serving of content and corresponding interface options and processing consequent selections. For example, the adaptive gateway 110 may control serving of one or more content objects for rendering on the first device 106 and facilitating one or more user-selectable interface elements via the first device 106. The adaptive gateway 110 may receive and process indicia of one or more selections corresponding to the one or more user-selectable interface elements, the indicia received from the first device 106. Responsive to the indicia received, the adaptive gateway 110 may transmit one or more transmissions to instruct the controller device 126 to perform an operation with respect to a corresponding sensor 116. Further aspects of the one or more methods are disclosed further herein.

Figure 3:
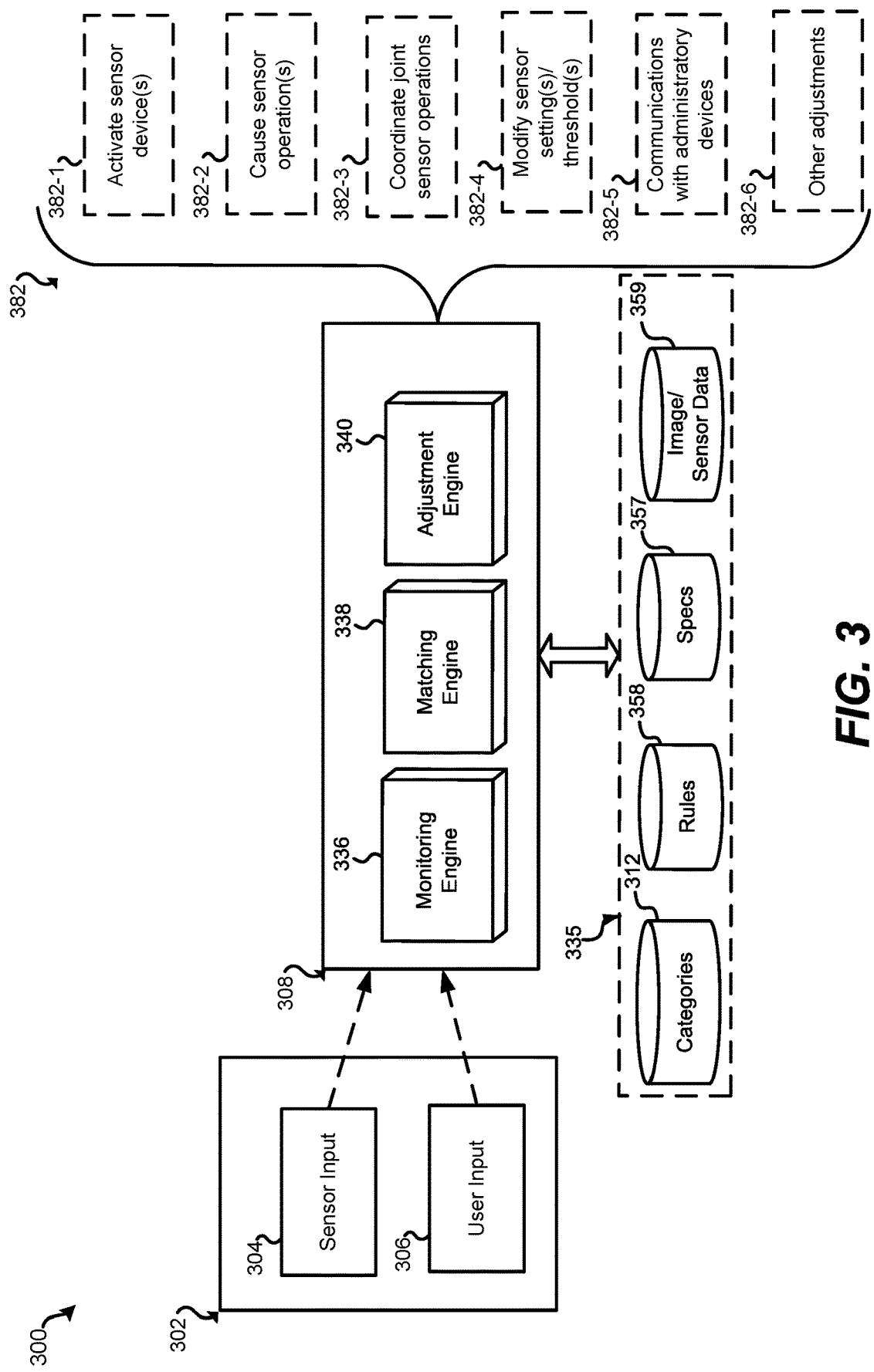
FIG. 3 illustrates a subsystem to facilitate adaptive monitoring and authentication control, in accordance with disclosed embodiments of the present disclosure.

FIG. 3 illustrates a subsystem 300 to facilitate adaptive monitoring and authentication control, in accordance with certain embodiments of the present disclosure. The subsystem 300 may correspond to aspects of the system 100. While the subsystem 300 is illustrated as being composed of multiple components, it should be understood that the subsystem 300 may be broken into a greater number of components or collapsed into fewer components. Each component may include any one or combination of computerized hardware, software, and/or firmware. In various embodiments, the subsystem 300 may include one or more adaptive processing and controlling devices 308 and one or more storage repositories 335, which may be included in the system controller 108 and/or adaptive gateway 110 and which may be located on the premises or remotely therefrom such as in the cloud. The subsystem 300, including the system controller 108 and/or adaptive gateway 110 that may be or include an adaptive control device, may perform operations for adaptive monitoring and authentication control for a premises 102 on which a raised structure 105 is located, according to various embodiments.

Figure 4:
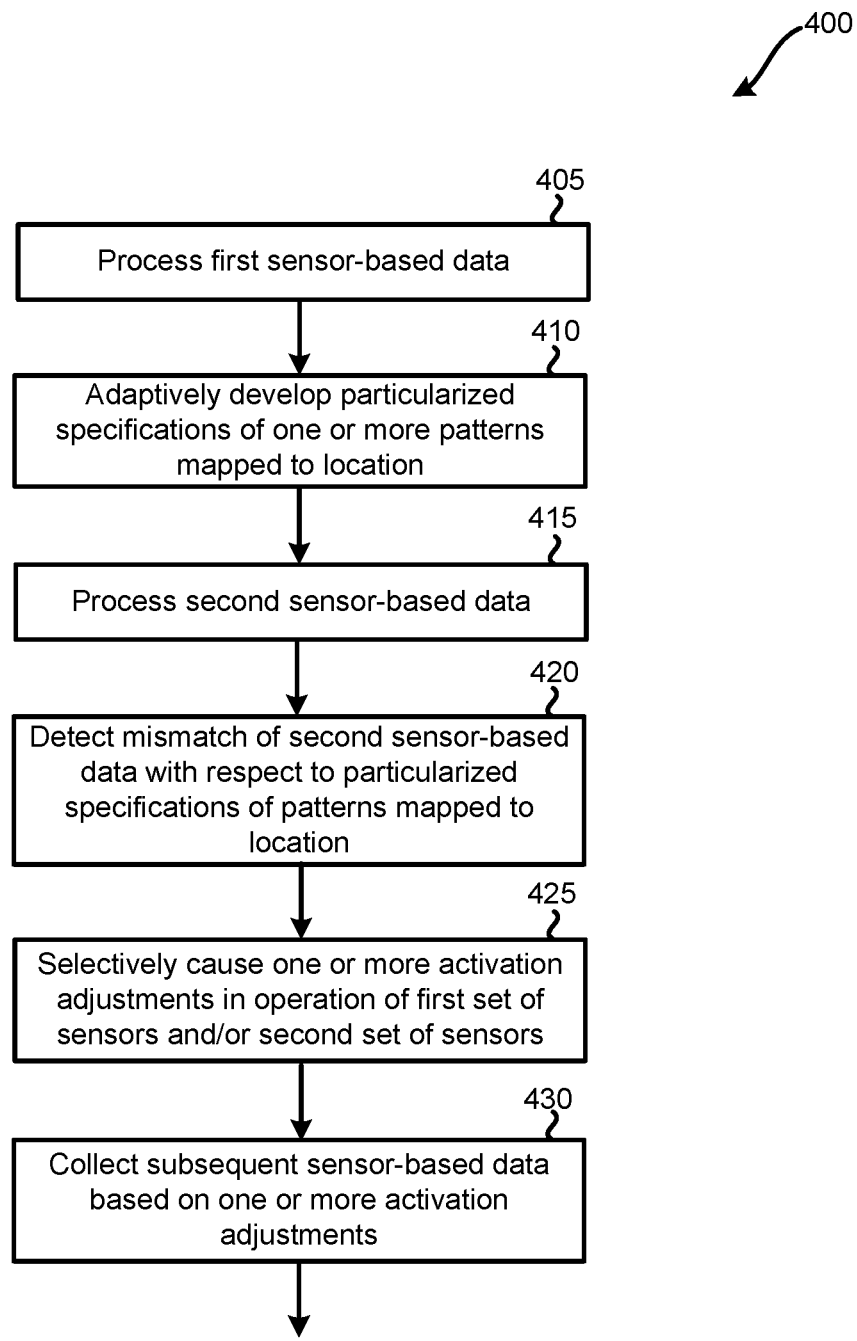
FIG. 4 illustrates an example method for adaptive monitoring and authentication control, in accordance with disclosed embodiments of the present disclosure.

For example, FIG. 4 illustrates one example method 400 for adaptive monitoring and authentication control, in accordance with certain embodiments of the present disclosure. One or a combination of the aspects of the method 400 may be performed in conjunction with one or more other aspects disclosed herein, and the method 400 is to be interpreted in view of other features disclosed herein and may be combined with one or more of such features in various embodiments. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously.

As indicated by block 405, first sensor-based data received from a first set of one or more sensors 116 communicatively coupled to the adaptive control device may be processed, consequent to the first set of one or more sensors 116 detecting phenomena on or around a raised structure 105, the first sensor-based data corresponding to the detected phenomena. As indicated by block 410, a particularized specification of one or more recognized patterns mapped to a particular location may be adaptively developed based at least in part on processing the first sensor-based data, the particularized specification of the one or more recognized patterns comprising one or more recognized patterns of sensor input from the first set of one or more sensors 116. As indicated by block 415, second sensor-based data that is based at least in part on the first set of one or more sensors 116 may be processed, consequent to the first set of one or more sensors 116 detecting additional phenomena on or around the raised structure 105, the second sensor-based data corresponding to the detected additional phenomena. As indicated by block 420, a mismatch of the second sensor-based data with respect to the particularized specification of the one or more recognized patterns mapped to the location may be detected. As indicated by block 425, consequent to the detection of the mismatch, one or more activation adjustments 382 in operation of one or both of the first set of one or more sensors 116 and a second set of one or more sensors 116 may be selectively caused. As indicated by block 430, subsequent sensor-based data may be collected based at least in part on the one or more activation adjustments 382. Additional operations are disclosed further herein.

As disclosed herein, embodiments according to the present disclosure provide technological solutions to multiple problems existing with conventional systems and approaches. Conventional systems and approaches are deficient in timeliness, adaptability, sensitivity, responsiveness, accuracy, and providing access with respect to adaptive monitoring and authentication for a premises on which a raised structure is located. The technical improvements provided by the system 100 include improvements in timeliness, adaptability, sensitivity, responsiveness, accuracy, and providing access based at least in part on adaptive machine-based control that is based at least in part on learned patterns of sensor-based input, causes real-time activation adjustments 382, and causes appropriate multi-stage, multi-modal control and operation of sensors 116 in real-time depending on the adjustment determinations where multiple stages of authentication processes with different types of sensors are intelligently triggered in different ways as a function of the adjustment determinations. Further, among other things, the technical improvements provided by disclosed embodiments solve problems associated with multiplicities of sensor data being extremely computing-resource intensive—which is especially problematic at scale when simultaneously hosting services for many devices. While processing sensor-based data from a multiplicity of sensors is extremely computing-resource intense, disclosed embodiments with selective, multi-stage sensor throttling/adjustment can require significantly fewer computing resources than otherwise, reduce latency, and increase operational speed to provide faster access at scale to manifold endpoint devices.

Referring again to FIG. 3, the subsystem 300 includes a system control engine 308, which may be included in the system controller 108 and may executed by one or more processors of the system controller 108 in some embodiments. The system control engine 308 may be communicatively coupled with interface components and communication channels (which may take various forms in various embodiments as disclosed herein) configured to receive adjustment input 302. As depicted, the adjustment input 302 may include sensor input 304 and user input 306.

The subsystem 300 may process the adjustment input 302, including sensor input 304, and analyze the adjustment input 302, including the sensor input 304, to provide for adaptive monitoring and authentication control features disclosed herein. The sensor input 304 may be captured by the sensors 116. The control engine 308 may include a monitoring engine 336 configured to monitor the adjustment input 302. In some embodiments, the monitoring engine 336 may correspond to the monitoring and control module 120. The control engine 308 may include a matching engine 338 that may be an analysis engine configured to determine any suitable aspects pertaining to aspects of the premises 102, premises states, raised structures 105 and corresponding states, one or more conditions at the premises 102, objects and individuals at the premises 102, and/or the environment proximate to the premises 102 based at least in part on adjustment input 302 received and processed by the monitoring engine 336. The matching engine 338 may correspond to a learning engine that includes logic to implement and/or otherwise facilitate any taxonomy, classification, categorization, correlation, mapping, qualification, scoring, organization, and/or the like features disclosed herein. In various embodiments, the matching engine 338 may be configured to analyze, classify, categorize, characterize, tag, and/or annotate sensor-based data. The matching engine 338 may employ one or more artificial intelligence (machine learning or, more specifically, deep learning) algorithms to perform pattern matching to detect patterns of metrics of the sensor-based data. In some embodiments, the monitoring engine 336 and/or the matching engine 338 may facilitate one or more learning/training modes disclosed herein.

In various embodiments, the matching engine 338 may generate, develop, and/or otherwise use individual specifications 357, object specifications 357, premises specifications 357, categories 312, and/or rules 358 for individuals, objects, and/or aspects of the premises 102 sensed based at least in part on adjustment input 302. The matching engine 338 may, for example, correlate items of sensed identification data, action data, location data, temporal data, contextual data, and/or the like. The matching engine 338 may compile any one or combination of such data to create, based at least in part on machine-learning, pattern data that may include pattern particulars to facilitate detection, recognition, and differentiation of patterns for object, individual, and other aspects of the premises 102 based at least in part on items of sensed identification data, action data, location data, temporal data, contextual data, and/or the like. The matching engine 338 may include a reasoning module to make logical inferences from a set of the detected and differentiated data to infer one or more patterns of sensed identification data, action data, location data, temporal data, contextual data, and/or the like for individuals, objects, and/or aspects of the premises 102 sensed. For instance, the pattern data may include information about any one or combination of identification histories, action histories, location histories, temporal histories, and/or the like, any set of which may be used to derive one or more of such patterns. A pattern-based reasoner could be employed to use various statistical techniques in analyzing the data in order to make inferences based on the analysis of the different types of adjustment data 302, both current and historical. A transitive reasoner may be employed to infer relationships from a set of relationships related to different types of adjustment data 302.

The monitoring engine 336 and/or the matching engine 338 may employ an ongoing learning mode to confirm, correct, and/or refine determinations made for the individual specifications 357, object specifications 357, premises specifications 357, categories 312, and/or rules 358. For example, having come to one or more conclusions about endpoints and/or conditions sensed, the control engine 308 may confirm and/or correct the determinations with feedback loop features. Certain embodiments may provide one or more devices 106 with feedback options to facilitate the ongoing learning mode. User-selectable options via a device interface provided with notifications (e.g., push notifications to device 106 and/or the like) could be provided to allow administrative confirmation or correction of conditions detected. The feedback could be used for training the system to heuristically adapt conclusions, specifications, correlations, attributes, triggers, patterns, and/or the like.

The matching engine 338 may perform any one or combination of image recognition, location detection, audio recognition, infrared impressions recognition, heat impressions recognition, movement recognition, vibrational/seismic recognition, and/or the like. The matching engine 338 may be configured to match information for objects, individuals, and aspects on the premises 102 captured via the monitoring engine 336 to one or more categories 312 from a set of categories 312, corresponding specifications 357, and corresponding adjustments 382. For example, the matching engine 338 may receive sensor data 304 corresponding to one or more objects, individuals, or aspects on the premises 102, identify attributes of the one or more objects, individuals, or aspects based at least in part on the sensor data 304, match the one or more objects, individuals, or aspects to one or more categories 312 from a category information repository 312, and identify characteristics of the objects, individuals, or aspects. Any suitable category 312 may be employed to facilitate adjustment 382 features in accordance various embodiments. Some embodiments may qualify captured data according to a graduated identification scale. Authentication data (adjustment data 302) can be consolidated and processed to yield an authentication score. Any one or combination of types of authentication data may be captured and qualified.

As disclosed herein, the one or more sensors 116 may include, for example, one or more cameras. The camera can be any device configured to generate image and/or audio data including, for example, still image data, video image data, and/or any sound data, corresponding to detected phenomena. The one or more sensors 116 of different types may include infrared sensors and/or heat sensors. In some embodiments, the camera(s) may include one or more infrared cameras. The camera(s) may, in some embodiments, include infrared sensors. The camera(s) may provide a video and, in some embodiments, an audio stream. The matching engine 338 may perform image analysis of image data captured with cameras to determine one or more image baselines for individuals, objects, and/or aspects of the premises 102 as disclosed herein. The visual characteristics of an individual, object, and/or aspect of the premises 102 may be identified at least in part by formatting, rescaling, cropping, and/or otherwise preparing images (or portions of the images where the outer shapes are defined as boundaries) for further image processing. The matching engine 338 may include an image analyzer and handling module, and may learn patterns of sensor-based data corresponding to visual characteristics of the sensor-based data gathered regarding the loads such as one or a combination of colors and any visual metric based at least in part on light detection—e.g., aggregate color palette, color palette as a function of time, changes in light, objects recognized, static/moving objects, pixel identification, detecting color component values, detecting color codes, and/or the like. These different visual metric types may be bases for various visual metric categories. Ranges of visual metric values for these different visual metric types may be mapped to visual metric categories. Captured image data may be correlated to reference images using any suitable object trait qualifications (e.g., size, shape, salient features, corresponding colors, and/or the like) for correlation.

In some embodiments, the rules 358 stored in the one or more storage repositories 335 may include criteria for matching a set of indicia of individuals, objects, or aspects of the premises 102 to a set of one or more categories 312. In some embodiments, the rules 358 may include criteria for matching a set of one or more categories 312 to a set of one or more control adjustments 382. In some embodiments, rules 358 may include one or more rules for matching a set of one or more image features (e.g., size, shape, salient features, corresponding colors, and/or the like) of a detected individual, object, or aspect with a set of one or more control adjustments 382, a specification for a continuous feed of certain type of sensor data capturing phenomena (e.g., a continuous video feed to be exposed via an interface 106), a specification for a certain type of sensor data capturing phenomena which may be triggered upon sensing a trigger event (e.g., provide rolling windows of sensor-captured phenomena, such as video of the load to be exposed via an interface 106 upon a trigger event or for a period of time, such as 30 seconds before and 30 seconds after a trigger event), and/or the like.

Some embodiments may allow for matching detected individuals or objects (e.g., via image recognition) with other individual or object types (e.g., using any suitable load trait qualifications for correlation). For example, the matching engine 338 may link a particular individual or object to reference image data 359 associated with particular individual or object types to identify a known individual or object type or a new individual or object type. If it is determined that one or more of the individual or object characteristics do not match individual or object characteristics associated with one or more categories, it may be determined whether one or more of the characteristics match another already categorized individual or object. The one or more individual or object characteristics may be compared with those of another individual or object. If characteristics matched with a second individual or object satisfy a threshold, the individual or object can be determined to match with the category of the second individual or object. Then, the individual or object can be associated with the category of the second individual or object.

Some embodiments may qualify an individual or object according to a graduated authentication scale. Any suitable authentication scale may be used in various embodiments. Any suitable authentication scale may be used in various embodiments. In some embodiments, an authentication scale could entail a categorization scheme, with categories 312 such as strong authentication, possible authentication, weak authentication, and an unknown of an individual, object or aspect, or any suitable categories such as other categories disclosed herein. The rules 358 may include authentication criteria for matching a set of indicia of an individual or object to a set of one or more categories 312. In some embodiments, the rules 358 may include criteria for matching captured data corresponding to a detected individual or object to one or more operational settings of one or more sensors 116.

In disclosed embodiments, an authentication scale could entail an authentication scoring system. The authentication scoring system could be correlated to the category scheme in some embodiments, such that certain scores correspond to certain categories 312. Some embodiments may score an endpoint with a numerical expression, for example, an authentication score. For example, in some embodiments, an authentication score may be an assessment of a certainty with which the system identifies an individual or object, characterizes integrity of the individual or object, and authenticates the individual or object, taking into account a number of factors, each of which may be weighted differently. By way of example without limitation, an authentication scale could include a range of authentication scores from 0 to 100, or from 0 to 1,000, with the high end of the scale indicating greater probability. Some embodiments may use methods of statistical analysis to derive an authentication score. Various embodiments may determine an authentication score based on any one or more suitable quantifiers. An authentication score may be based at least in part on the extent to which detected characteristics of the captured data match previously determined characteristics stored in the specifications. In some embodiments, an authentication score may be cumulative of scores based on matching each type of the characteristics. With an authentication score determined, categorizations may be made based on the score. By way of example without limitation, a score correlated to a 75-100% band may be deemed a positive authentication of an individual or object; a score correlated to a 70-75% band may be deemed a possible authentication; a score correlated to a 25-50% band may be deemed a weak authentication; a score below a 25% minimum threshold may be deemed a weak/insufficient authentication; and score of zero may correspond to an unknown, unauthenticated, and/or highly suspicious individual or object. In some embodiments, anything below a positive authentication may be deemed by the system be an inconsistency/nonconformity, triggering adjustments 382. For example, for a weakly identified individual or object, the subsystem 300 may prompt further authentication via additional sensors 116 and sensor data of the same and/or different type. Various types of adjustments 382 are disclosed herein which may be triggered by one or a combination of the varying degrees of authentication. In some cases, the subsystem 300 may cause one or more notifications (push notifications, automated system voice announcements, pop-ups on an endpoint interface communicatively coupled with the system, emails, automated phone calls, alarms, etc.) to be directed to one or more devices 106 and/or accounts based at least in part on data retained in user specifications, and the control engine 308 may require additional authentication, which could be captured consequent to the one or more notifications.

In various embodiments, one or more cameras 116, infrared sensors 116, and/or heat sensors 116 may be configured to capture image, infrared, and/or heat data indicative of individuals and/or individual states, such as any one or combination of facial recognition, optical recognition, infrared impressions, heat impressions, gestures, other individual movements, and/or the like. Data captured from such sensors may be used in authentication processes disclosed herein, in particular for recognizing baselines and deviations therefrom. Some embodiments may perform image analysis of image data captured with cameras 116 to determine one or more image baselines for individuals on the premises 102. Captured individual image data may be correlated to reference images using any suitable facial trait qualifications for correlation. As disclosed herein, a matching engine 338 may link particular individual image data to user profiles 359 with image data associated with individuals, to identify a known person or a new person (e.g., based at least in part on satisfying one or more thresholds that may correspond to a tolerance range of the extent of matching characteristics, in some embodiments). The reference image data 359 may be refined over time as an image baseline(s) for a particular individual is developed with additional data captures. Likewise, the matching engine 338 may link particular image data of objects and/or aspects of the premises 102 to image profiles 359 with image data associated with objects and/or aspects, to identify a known objects and/or aspects or new objects and/or aspects (e.g., based at least in part on satisfying one or more thresholds that may correspond to a tolerance range of the extent of matching characteristics, in some embodiments). The reference image data 359 may be refined over time as an image baseline(s) for a particular individual is developed with additional data captures. Such reference images 359 may be used by the system controller 108 to identify inconsistencies/nonconformities with respect to particularized patterns. When such inconsistencies/nonconformities satisfy one or more thresholds, certain adjustments 382, such as security measures, may be caused.

Similarly, some embodiments may perform infrared analysis of infrared data captured with infrared sensors 116 to determine one or more infrared baselines for individuals on the premises 102. Some embodiments may perform infrared analysis of heat data captured with heat sensors 116 to determine one or more heat baselines for individuals on the premises 102. Captured individual sourced infrared and/or heat data may be correlated to reference infrared and/or heat impressions 359. As disclosed herein, a matching engine 338 may link particular individual infrared and/or heat impressions to user profiles 359 with infrared and/or heat impressions associated with individuals, to identify a known person or a new person. Again, the matching engine 338 may likewise perform such recognition operations with respect to objects and/or aspects of the premises 102 with respect to reference data 359. The reference infrared and/or heat impressions data 359 may be refined over time as infrared and/or heat baseline(s) for a particular individual are developed with additional data captures. Such reference impressions 359 may be used by the system controller 108 to identify inconsistencies/nonconformities with respect to particularized patterns. When such inconsistencies/nonconformities satisfy one or more thresholds, certain adjustments 382, such as security measures, may be caused.

Some embodiments may perform audio analysis of audio data captured with audio sensor 116 to determine one or more sound baselines for locations on the premises 102. The control engine 308 may perform audio analysis of audio data captured with audio sensor and/or microphones 116 to determine one or more sound baselines for particular individuals, objects, and/or aspects of the premises 102. The matching engine 338 may learn patterns of sensor-based data metrics corresponding to audio characteristics disclosed herein, such as tonal, pitch, and volume characteristics; keywords and corresponding language used; ambient noise; and/or the like as distinctive markings. The matching engine 338 may include an audio analyzer and handling module to facilitate that detection, which may detect one or more audio characteristics by way of analyzing audio, applying voice recognition, acoustic spectrum analysis, and/or the like. For example, an acoustic analysis may include analyzing and identifying the sample for acoustic characteristics such as frequencies, intensities, tones, pitches, and/or the like audio metrics over time. The different audio metric types may be bases for various audio metric categories. Ranges of audio metric values for the different audio metric types may be mapped to audio metric categories 312. The matching engine 338 may select values of one or a combination of the acoustic metrics as distinctive markings and may compile the values as an acoustic impression for the purposes of characterizing a sample. The acoustic impression may include a spectrum of frequencies in various embodiments. In some cases, the matching engine 338 may correlate the acoustic impression to one or more audio metric categories 312 for the similar acoustic impressions. In various embodiments, the correlation may be based at least in part on matching selected values of the acoustic metrics (e.g., distinctive values such as peaks, baselines, averages, etc.) to acoustic metric ranges of values specified for certain audio metric categories 312. Thus, the audio impressions may be used by the system controller 108 to identify inconsistencies/nonconformities of real-time audio detection with respect to particularized patterns. When such inconsistencies/nonconformities satisfy one or more thresholds, certain adjustments 382, such as security measures, may be caused.

Similarly, some embodiments may perform vibrational analysis of vibration data captured with vibration sensor 116 to determine one or more sound baselines for locations on the premises 102. For example, a sound baseline may be determined for the raised structure 105 or portions thereof, the fence or portions thereof, and/or any of various locations on the premises 102. Like with other baselines of any other type of sensor data disclosed herein gathered to determine patterns, variations of the baselines may be recorded for different times of day, days, weeks, months, etc. to determine audio impressions of locations on the premises 102 (which may include sounds from non-human sources, such as devices, animals, environmental conditions, etc.) and humans thereon. Such audio impressions may be used by the system controller 108 to identify inconsistencies/nonconformities of real-time audio detection with respect to particularized patterns. When such inconsistencies/nonconformities satisfy one or more thresholds, certain home adjustments 382, such as security measures, may be caused. Likewise, a vibration baseline may be determined for the raised structure 105 or portions thereof, the fence or portions thereof, and/or any of various locations on the premises 102. Variations of the baselines may be recorded for different times of day, days, weeks, months, etc. to determine vibration impressions of locations on the premises 102, which, again, may include vibrations from non-human sources and humans therein. Such vibration impressions may be used by the system controller 108 to identify inconsistencies/nonconformities of real-time vibration detection with respect to particularized patterns. When such inconsistencies/nonconformities satisfy one or more thresholds, certain adjustments 382, such as security measures, may be caused.

Some embodiments further may include one or more weather sensors 116 configured to detect various environmental phenomena such as rain, snow, fog, wind speed, barometric pressure, temperature, humidity, and/or the like and output various forms of corresponding environmental data that the control engine 308 may utilize to recognize certain types of weather conditions, which the control engine 308 may then correlate with other types of sensor data concurrently captured. One problem with sites with raised structures 105 is that such sites are often subject to various types of weather conditions, often extreme, that are experienced at various remote locations. Such environmental conditions can impact the recognition accuracy of conventional recognition systems. However, the control engine 308 may recognize various types of the varying environmental conditions and may account for the various types in conjunction with other features disclosed herein. For example, the control engine 308 may factor in particular types of weather conditions when learning different reference sensor data, such as reference images for different conditions. The different types of weather conditions may affect how phenomena is detected. Take reference images for a particular object or individual, for example, the control engine 308 may learn one or more sets of reference images for falling snow conditions at varying degrees of intensity, one or more sets of reference images for accumulated snow conditions at various depths, one or more sets of reference images for at varying degrees of intensity, one set for clear and sunny conditions, one or more sets of reference images for fog conditions, one or more sets of reference images for night conditions, and/or the like. Accordingly, the control engine 308 may learn to differentiate different types of images and correlate the different types of images to recognize objects or individuals under particular environmental conditions, with the recognition being a function of the particular environmental conditions.

In various embodiments, the system controller 108 may calculate or otherwise determine dimensions of the objects, individuals, and variances in the premises 102 (e.g., depths of snow accumulations, depths of tire ruts, and/or the like) least in part by correlating sensor data (e.g., currently detected image data) of the objects, individuals, and variances to reference sensor data 359 (e.g., reference images and/or pattern data) as disclosed herein. Such estimations may be based upon correlation data gathered by the control engine 308. In some embodiments, the correlation data may be learned by the control engine 308 based at least in part on past patterns of sensor data of objects, individuals, or structures of particular types and size categories matched with indicia of dimensions. The indicia of dimensions may correspond to user input of dimensions. The correlations of sensor metrics of objects, individuals, or structures to dimension estimations may be refined over time with feedback features disclosed herein, which may include presentation of estimated dimensions with one or more user devices 106 along with interface elements to prompt a user input/feedback regarding the estimations. The correlations of sensor metrics of objects, individuals, or structures (e.g., image data from image sensors) may be likewise correlated to particular object, individual, or structure types and size categories so that the control engine 308 learns to recognize particular object, individual, or structure types. The size categories may be determined by the control engine 308 based at least in part on matching one or both of image data and dimension data from image sensors 116 to reference image data and dimension data mapped to particular size categories. The size categories may be differentiated based at least in part on dimensions to take into account varying heights, widths, and/or depths. Again, such correlations may be refined over time with feedback features. In some embodiments, sensor data corresponding to the determined dimensions (e.g., one or more images, video) and/or one or more content composites indicating the determined dimensions may be transmitted by the system controller 108 to one or more user devices 106 for presentation with the one or more user devices 106.

The control engine 308 may include an adjustment engine 340 configured to cause the one or more adjustments 382 disclosed herein. In some embodiments, the adjustment engine 340 may analyze input monitored by the monitoring engine 336, determinations of the matching engine 338, and/or information stored in one or more repositories 335 to make adjustment 382 determinations. Based at least in part on one or more adjustment 382 determinations, the adjustment engine 340 may cause activation of one or more adjustment 382 actions. The control engine 308 may transmit one or more signals to one or more sensors 116 and/or one or more controllers 126 to cause the one or more sensors 116 and/or one or more controllers 126 to perform one or more operations in accordance with the one or more adjustment 382 determinations. The activation adjustments 382 may include one or a combination of operations.

One of the problems with sites having raised structures 105 as the difficulty of detecting wide ranges around corners and not focusing on particular locations when needed at particular times. However, disclosed embodiments provide for a solution that includes the ability to orchestrate a plurality of sensors 116 to detect wide ranges about a raised structure 105 and other structures on a premises 102 while providing sensor coordination with adaptive adjustments to focus sensor detection on particular locations, objects, and/or individuals at particular times when needed. Accordingly, the activation adjustments 382 may include causing activation of one or more controllers 126 and/or sensors 116. Additionally or alternatively, the activation adjustments 382 may include causing one or more particular operations of one or more controllers 126 and/or sensors 116. Additionally or alternatively, the activation adjustments 382 may include modification of operational control settings and/or thresholds of one or more controllers 126 and/or sensors 116. The activation adjustments 382 may include causing sensor operations such as causing a sensor 116 to adjust pan, tilt, and/or zoom/focus to/in on a particular location, object, and/or individual on the premises 102. Additionally or alternatively, the activation adjustments 382 may include coordinating and causing joint operations of multiple sensors 116. Multiple sensors 116 may be cooperatively operated to facilitate identification of objects, individuals, and conditions on the premises 102.

As disclosed herein, one or more sets of one or more sensors 116 may be intelligently activated to operate with different modes of operation at different points in the adaptive monitoring and authentication control process. In various embodiments, sensors 116 may be activated to capture rolling windows of sensor data when an inconsistency/nonconformity with respect to a particularized pattern of sensor data is detected and/or at times when one or more of the method steps are performed. For example, when a first sensor 116 (of a first sensor type, such as a weather sensor, camera, etc.) detects sensor data that the control engine 308 determines to be inconsistent/nonconforming with the particularized pattern of sensor data learned by the control engine 308 for the first sensor 116 and the location on the premises 102 sensed by the first sensor 116, one or more additional sensors 116 (of the same sensor type and/or of a different sensor type) may be activated or otherwise caused to operate in a different mode of operation to capture additional sensor data corresponding to the location and/or a proximate location on the premises 102. As a further example, when a camera 116 detects phenomena that the control engine 308 determines to be inconsistent/nonconforming with the particularized pattern of image data learned by the control engine 308 for the camera 116 and the location on the premises 102 sensed by the camera 116, the control engine 308 may activate or cause to operate with a different mode of operation one or more additional sensors 116 (e.g., another camera, an infrared sensor, a sound sensor/microphone, etc.) to capture additional sensor data corresponding to the location and/or a proximate location on the premises 102. As another example, when a vibration sensor 116 detects vibrations at a portion of the fence of the premises 102 that the control engine 308 determines to be inconsistent/nonconforming with the particularized pattern of vibration data learned by the control engine 308 for the vibration sensor 116 and the location on the fence sensed by the vibration sensor 116, the control engine 308 may activate or cause to operate with a different mode of operation one or more additional sensors 116 to capture additional sensor data corresponding to the location and/or a proximate location on the premises 102. Other embodiments are possible. Accordingly, some embodiments may trigger and/or throttle sensor activation at various times, with sensor data capture being terminated or decreased at other times throughout an adaptive monitoring and authentication control process.

In some examples, an activation of the first set of one or more sensors 116 may correspond to a first mode of operation, an activation of a second set of one or more sensors 116 may correspond to a second mode of operation, etc. A mode of sensor operation may include sensor activation such that the sensor is in an on state, or a detection state, as a function of time. Activation of one or more sensors 116 may be time-based and/or event-based throughout an adaptive monitoring and authentication control process. For instance, one mode of operation may include sensor activation activated for detection and image capture responsive to a user request 306, with such activation being maintained for one or more specified durations. As another instance, a mode of operation may include a sensor 116 being activated repeatedly at regular intervals, random intervals, and/or upon triggering by the system controller 106 according to specifications of the adaptive monitoring and authentication control process. A mode of sensor operation may include sensor activation such that the sensor operates according to one or more specified rates, for example, sampling rates. A first mode of operation may correspond to a first sampling rate (e.g., number of frames per second, duration of video recording, number of still image captures per minute, number of images in a burst of still image captures, and/or the like), whereas a second mode of operation may correspond to a second sampling rate (e.g., a higher sampling rate may be selected when an inconsistency/nonconformity with respect to a particularized pattern of sensor data is detected). Likewise, the first mode of operation may correspond to a first resolution, whereas the second mode of operation may correspond to a second, higher resolution that may be triggered when an inconsistency/nonconformity with respect to a particularized pattern of sensor data is detected.

As an example with respect to coordinating joint sensor operations with respect to sensors 116 that capture image data, multiple sensors 116 may be coordinated to view and capture sensor data round corners of the structure 105 and/or other structures on the premises 102. Such multi-sensor coordination may allow for capture of phenomena that would otherwise be not captured, or insufficiently captured due to the variances of the structures and differences in the sensor positioning and the limitations in the fields of view of the sensors 116. For example, the control engine 308 may monitor the sensor adjustments of a first sensor 116 where the first sensor 116 is adjusted, either automatically by the sensor device 116 or by direction of the control engine 308, to detect an object and/or individual in a particular location on the premises 102. The first sensor 116 may, for example, be adjusted with changes in pan, tilt, and/or zoom/focus settings to detect an object and/or individual in a particular location on the premises 102. Specifications of the changes in pan, tilt, and/or zoom/focus settings and/or coordinates of the pan, tilt, and/or zoom/focus operations may be communicated by the first sensor 116 to the control engine 308 or otherwise may be monitored by the control engine 308. The control engine 308 may transform the sensor adjustments of the first sensor 116 to corresponding sensor adjustments for one or more other sensors 116 to cooperatively direct and/or adjust the one or more other sensors 116 to detect the object and/or individual in the particular location on the premises 102. The transformation of sensor adjustment specifications from a first sensor basis to a second sensor basis may include modifying operational settings of the first sensor with a positional delta that corresponds to a difference in location between the second sensor in the first sensor and may factor in differences in latitude, longitude, elevation, x-y-z coordinates, angular coordinates, GPS coordinates, and/or the like between the second sensor and the first sensor (e.g., pan, tilt, and/or zoom/focus of the second sensor may be adjusted to correspond to the sensor adjustment specifications of the first sensor as modified by the differences in location of the second sensor with respect to the first sensor). Additionally or alternatively, the transformation of sensor adjustment specifications from a first sensor basis to a second sensor basis may include modifying operational settings of the first sensor with a mapping of the premises 102. The control engine 308 may create a mapping of the premises 102, the locations of the sensors 116, and/or the detection ranges of the sensors 116. The mapping may define aspects of the premises 102, the locations of the sensors 116, and/or the detection ranges of the sensors 116 with location definitions and/or any suitable coordinate system, such one of the above coordinate systems. Using the mapping, the control engine 308 may identify a location of the object and/or individual, identify one or more ranges of detection of one or more other sensors 116 that can detect the location of the object and/or individual and/or a location proximate thereto, determine sensor adjustments (e.g., pan, tilt, and/or zoom/focus) as a function of the location and/or location proximate thereto, and communicate with the one or more other sensors 116 to direct and/or adjust the one or more other sensors 116 to detect the object and/or individual in the particular location on the premises 102 and/or detect phenomena in the location proximate thereto in accordance with the determined sensor adjustments.

Further, in conjunction with the above, such multi-sensor coordination may include multiple sensors 116 being cooperatively operated to anticipate and predict areas of interest to capture movement of objects and/or individuals on the premises 102. In some embodiments, the first sensor 116 may be configured to automatically track the moving object/individual. The control engine 308 may monitor the sensor adjustments that correspond to the tracking of the movement. The sensor adjustments may include, for example, specifications of the changes in pan, tilt, and/or zoom/focus settings and/or coordinates of the pan, tilt, and/or zoom/focus operations which may be communicated to or otherwise monitored by the control engine 308. The control engine 308 may transform the sensor adjustments of the first sensor 116 to corresponding sensor adjustments for the second sensor 116. For example, when one sensor 116 detects movement of an object or individual, the control engine 308 may identify a direction of the movement, plot a projected trajectory based at least in part on the identified direction and a mapping of the premises 102, a limitation on the field of view of the sensor 116, and at least a second sensor 116 that is disposed in a location to capture anticipated movement of the object along the determined trajectory. The control engine 308 may preemptively direct the second sensor 116 to adjust pan, tilt, and/or zoom/focus to capture the anticipated movement of the object when the object enters the field of view of the second sensor 116 along the determined trajectory.

To facilitate the mapping, some embodiments of the control engine 308 may include a facility modeling engine that may be configured to process manifold facility specifications 306 and/or sensor data 304 to form a composite model of premises information that may be stored in the data store 359. In some embodiments, the facility modeling engine may form, correlate, and update composite sets of facility specifications of premises 102. The facility modeling engine may aggregate and transform facility specifications received via the sensor input 304 and/or the user input 306 to create and update the composite model of facility-specific profile information. By way of example, facility specifications received from the user input 306 or recognized from the sensor input 304 may include any one or combination of images, video, location data (e.g., location data provided by way of GPS, Wi-Fi, cellular, and/or the like), facility descriptions, facility addresses, civil data, facility surveys (internal and/or external) mapping data pertinent to the facility, external images (e.g., satellite images of the facility, aerial images of the facility, and/or the like), internal images (e.g., capture images of the interior of the facility), geolocation data, and/or the like. Facility specifications may correspond to any one or combination of raw data, unstructured data, structured data, information, and/or content which may include media content, text, documents, files, instructions, code, executable files, images, video, audio, and/or any other suitable content suitable for embodiments of the present disclosure.

Additionally or alternatively, the activation adjustments 382 may include one or a combination of causing one or more transmissions to one or more devices 106 to cause the one or more devices 106 to display sensor data and/or content/indicia indicating the sensor data and/or one or more adjustment determinations. As disclosed further herein, notifications may be transmitted to one or more devices 106 to alert when trigger events are detected. The notifications may include sensor data corresponding to a trigger event (e.g., rolling windows of sensor data as disclosed further herein). Likewise, notifications may include content specifying a particular trigger event and/or one or more corresponding activation adjustments 382 made by the system in response to the trigger event. The notifications may include selectable interface elements prompting feedback. Feedback may be received consequent to selection of such elements and the control engine 308 may use the feedback to learn, over time, when and which trigger events and/or corresponding activation adjustments 382 to report conditions, and when and which trigger events and/or corresponding activation adjustments 382 to not report.

The adjustment input 302 may include user input 306. The user input 306 may include real-time user control via a user interface (e.g., one or more interfaces 106). The user input 306 may include one or more communication signals received consequent to selection of interface elements of the interfaces 106. The user input 306 may correspond to a selection of a type of adjustment 382, operational settings of an adjustment 382, a request for a continuous feed of certain type of sensor data capturing phenomena that may be exposed via an interface 106, a request for a certain type of sensor data capturing phenomena which may be triggered upon sensing that a specified threshold has been reached (e.g., provide rolling windows of sensor-captured phenomena, such as video of the load to be exposed via an interface 106 when the threshold has been reached or for a period of time, such as 30 seconds before and 30 seconds after a threshold has been reached), and/or the like.

Figure 5:
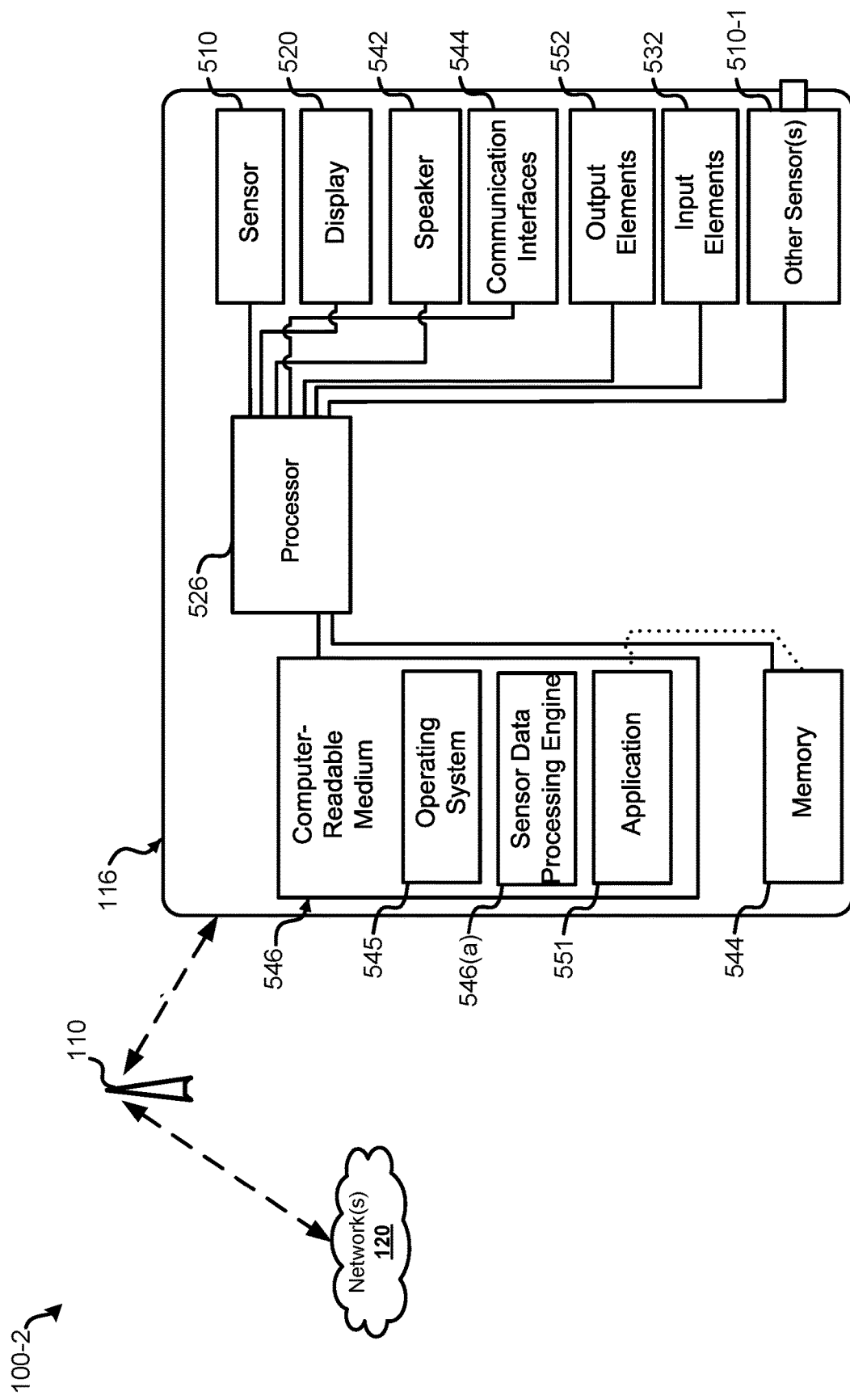
FIG. 5 illustrates certain aspects of the system, in accordance with disclosed embodiments of the present disclosure.

FIG. 5 illustrates certain aspects of the system 100, in accordance with embodiments of the present disclosure. FIG. 5 includes a block diagram of one non-limiting example of a sensor device 116 configured to make use of and interact with an adaptive gateway 110, in accordance with disclosed embodiments of the present disclosure. The sensor device 116 may be a portable device suitable for sending and receiving information to/from the adaptive gateway 110 in accordance with embodiments described herein. In some embodiments, the sensor device 116 may be provided with an application 551 or other form of software, which may be configured to run on the sensor device 116 to facilitate various embodiments of this disclosure. For example, execution of the application 551 or other software may cause the sensor device 116 to operate in accordance with protocols and methods disclosed herein to facilitate features of various embodiments. In various embodiments, the application 551 can be any suitable computer program that can be installed and run on the sensor device 116, and, in some embodiments, the application 551 may be another type of application, set of applications, and/or other executable code configured to facilitate embodiments disclosed herein. The application 551 may be provided in any suitable way. For example, the application 551 or other code may be made available from a website, an application store, the service provider 106, etc. for download to the sensor device 116; alternatively, it may be pre-installed on the sensor device 116.

The sensor device 116 may include a memory 544 communicatively coupled to a processor 526 (e.g., a microprocessor) for processing the functions of the sensor device 116. The sensor device 116 can also include at least one computer-readable medium 546 coupled to the processor 526, which stores application programs and other computer code instructions for operating the device, such as an operating system (OS) 548. In some embodiments, the application 551 or other software may be stored in the memory 544 and/or computer-readable media 546. Again, the example of sensor device 116 is non-limiting. Other devices, such as those disclosed herein, may be used.

In various embodiments, the sensor device 116 may include a display 520 and/or other output elements 552. In some embodiments, the sensor device 116 may include input elements 532 to allow a user to input information into the sensor device 116. By way of example, the input elements 532 may include one or more of a keypad, a trackball, a touchscreen, a touchpad, a pointing device, a microphone, a voice recognition device, or any other appropriate mechanism for the user to provide input. In various embodiments, the sensor device 116 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. In some embodiments, the sensor device 116 may include a speaker 542 to provide audio output to the user.

In some embodiments, the sensor device 116 may include at least one antenna for wireless data transfer to communicate with an adaptive gateway 110 as disclosed herein. The antenna may include a cellular antenna (e.g., for sending and receiving cellular voice and data communication, such as through a network such as a 3G, 4G, or 5G network). The communications interfaces 544 can provide one or more wireless communication interfaces to facilitate communications with an adaptive gateway 110 according to one or more of the communications protocols disclosed herein, e.g., with respect to the modules 336 of the adaptive gateway 110 (e.g., 433 MHz, 915 MHz, etc.), WiFi, Bluetooth (BLE), LTE, 5G, 4G, etc.).

The sensor device 116 may include one or more sensors 510 that may, for example, include one or a combination of proximity sensors, motion detectors, light sensors, cameras, infrared sensors, vibrational detectors, microphones, other audio sensors, temperature sensors, humidity sensors, barometric sensors, RFID detectors, reed switches, and/or the like configured to implement sensor IoT protocols disclosed herein. The sensor device 116 may store sensor data in the non-transitory computer-readable storage medium 546 and/or the memory 544. In some embodiments, the computer-readable medium 546 can also include a sensor data processing engine 546(a) configured to perform processing of sensor data captured by the sensor(s) 510 to analyze, aggregate, consolidate, reformat, and/or other prepare the sensor data for transmission to an adaptive gateway 110. It will be apparent to those skilled in the art that substantial variations may be made in accordance with specific requirements. For example, customized hardware might also be used, and/or particular elements might be implemented in hardware, software (including portable software, such as applets, etc.), or both.

Figure 6:
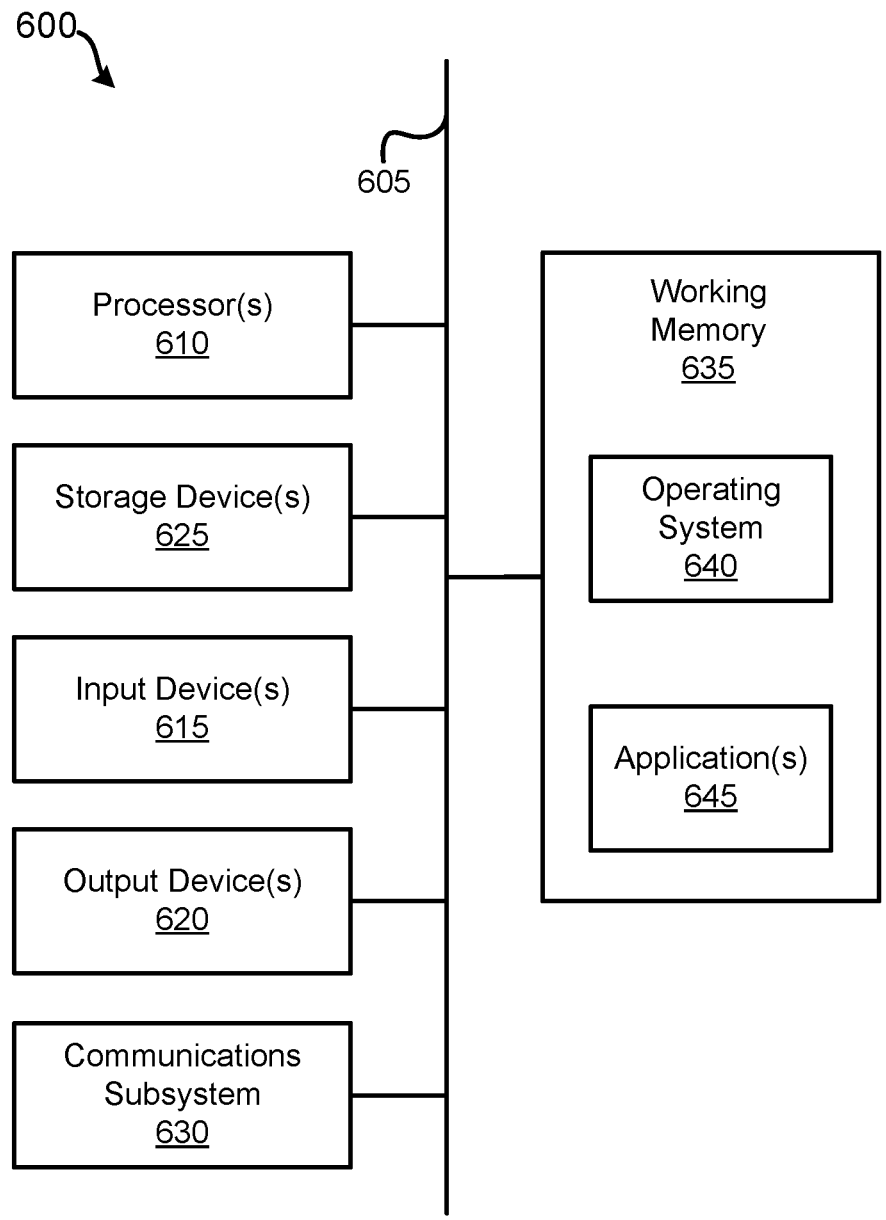
FIG. 6 illustrates aspects of a computer system that may be incorporated as part of the system controller and devices, in accordance with disclosed embodiments of the present disclosure.

FIG. 6 illustrates aspects of a computer system 600 that may be incorporated as part of the system controller 108, sensors 116, controller devices 126, and/or devices 106 in accordance with embodiments of this disclosure. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium," "computer-readable medium," and that plural forms thereof as used herein, refer to any medium or media that participate in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to facilitate adaptive monitoring and authentication control for a premises on which a raised structure is located, the system comprising:

one or more processing devices; and
   memory communicatively coupled with and readable by the one or more processing devices and having stored therein machine-readable instructions which, when executed by the one or more processing devices, cause the one or more processing devices to perform operations comprising:

processing first sensor-based data received from a first set of one or more sensors comprising one or more image sensors, consequent to the first set of one or more sensors detecting phenomena on or around the raised structure, the first sensor-based data comprising image data corresponding to the detected phenomena;

adaptively developing a particularized specification of one or more patterns of recognized activity on or around the raised structure over time mapped to a first location based at least in part on recognition of an individual and/or an object from the image data, the particularized specification of the one or more patterns of recognized activity comprising one or more patterns of recognition corresponding to visual characteristics of a recognized individual and/or a recognized object over time, wherein the adaptively developing comprises detecting a plurality of environmental conditions, learning different reference images for different environmental conditions of the plurality of environmental conditions, and correlating the different reference images to recognize the individual and/or the object as a function of the different environmental conditions;

processing second sensor-based data that is based at least in part on the first set of one or more sensors, consequent to the first set of one or more sensors detecting additional phenomena corresponding to a second individual and/or a second object on or around the raised structure, the second sensor-based data comprising additional image data corresponding to the detected additional phenomena;

detecting a mismatch of the second sensor-based data, including the additional image data, with respect to the particularized specification of the one or more patterns of recognized activity mapped to the first location, including the one or more patterns of recognition; and consequent to the detection of the mismatch, selectively causing activation adjustments in cooperative operations of the first set of one or more sensors and a second set of one or more sensors, and collecting subsequent sensor-based data to detect the second individual and/or the second object based at least in part on the activation adjustments and the cooperative operations of the first set of one or more sensors and the second set of one or more sensors.

2. The system to facilitate adaptive monitoring and authentication for a premises on which a raised structure is located as recited in claim 1, where the activation adjustments comprise modifying one or more operational settings of one or both of the first set of one or more sensors and the second set of one or more sensors.

3. The system to facilitate adaptive monitoring and authentication for a premises on which a raised structure is located as recited in claim 1, where the particularized specification of the one or more patterns of recognized activity mapped to the first location corresponds to a recognition of one or more of an individual, an object, or an aspect of the raised structure or of a premises on which the raised structure is located.

4. The system to facilitate adaptive monitoring and authentication for a premises on which a raised structure is located as recited in claim 1, the operations further comprising:

accessing a set of one or more identification rules specified by the particularized specification of the one or more patterns of recognized activity, the set of one or more identification rules comprising criteria for identifying sensed individuals, where the particularized specification of the one or more patterns of recognized activity mapped to the first location corresponds to a recognition of at least one individual and is mapped to an identifier of the at least one individual;

where the detecting the mismatch of the second sensor-based data with respect to the particularized specification of the one or more patterns of recognized activity mapped to the first location is based at least in part on analyzing the second sensor-based data using the identification rules to determine that the second sensor-based data corresponds to an insufficient identification of an individual.

5. The system to facilitate adaptive monitoring and authentication for a premises on which a raised structure is located as recited in claim 4, the operations further comprising:

storing the particularized specification of the one or more patterns of recognized activity mapped to the first location and mapped to an identifier of the at least one individual.

6. The system to facilitate adaptive monitoring and authentication for a premises on which a raised structure is located as recited in claim 5, the operations further comprising:

receiving subsequent sensor-based data from one or both of the first set of one or more sensors and the second set of one or more sensors consequent to the activation adjustments; and transmitting a communication to an endpoint device and/or an account associated with a user to facilitate authenticated access to the first sensor-based data, the second sensor-based data, and/or the subsequent sensor-based data consequent to authentication of the endpoint device and/or the account associated with the user.

7. The system to facilitate adaptive monitoring and authentication for a premises on which a raised structure is located as recited in claim 6, where the communication comprises an indication of the insufficient identification, and the operations further comprise:

processing one or more user selections corresponding to one or more user-selection options, the one or more user selections responsive to the communication; and authenticating the individual based at least in part on the one or more user selections.

8. The system to facilitate adaptive monitoring and authentication for a premises on which a raised structure is located as recited in claim 1, where the processing the second sensor-based data comprises determining a particular location of the additional phenomena, and the activation adjustments are a function of the particular location.

9. The system to facilitate adaptive monitoring and authentication for a premises on which a raised structure is located as recited in claim 8, the operations further comprises:

determining a movement in the first location based at least in part on the second sensor-based data;

where the activation adjustments are a function of the movement.

10. The system to facilitate adaptive monitoring and authentication for a premises on which a raised structure is located as recited in claim 9, where the activation adjustments are based at least in part on anticipating additional movement in a second location subsequent to the movement corresponding to the first location.

11. One or more non-transitory, machine-readable media having machine-readable instructions thereon which, when executed by one or more processing devices, cause the one or more processing devices to perform operations comprising:

processing first sensor-based data received from a first set of one or more sensors comprising one or more image sensors, consequent to the first set of one or more sensors detecting phenomena on or around a raised structure, the first sensor-based data comprising image data corresponding to the detected phenomena;

adaptively developing a particularized specification of one or more patterns of recognized activity on or around the raised structure over time mapped to a first location based at least in part on recognition of an individual and/or an object from the image data, the particularized specification of the one or more patterns of recognized activity comprising one or more patterns of recognition corresponding to visual characteristics of a recognized individual and/or a recognized object over time, wherein the adaptively developing comprises detecting a plurality of environmental conditions, learning different reference images for different environmental conditions of the plurality of environmental conditions, and correlating the different reference images to recognize the individual and/or the object as a function of the different environmental conditions;

processing second sensor-based data that is based at least in part on the first set of one or more sensors, consequent to the first set of one or more sensors detecting additional phenomena corresponding to a second individual and/or a second object on or around the raised structure, the second sensor-based data comprising additional image data corresponding to the detected additional phenomena;

detecting a mismatch of the second sensor-based data, including the additional image data, with respect to the particularized specification of the one or more patterns of recognized activity mapped to the first location, including the one or more patterns of recognition; and consequent to the detection of the mismatch, selectively causing activation adjustments in cooperative operations of the first set of one or more sensors and a second set of one or more sensors, and collecting subsequent sensor-based data to detect the second individual and/or the second object based at least in part on the activation adjustments and the cooperative operations of the first set of one or more sensors and the second set of one or more sensors.

12. The one or more non-transitory, machine-readable media as recited in claim 11, where the activation adjustments comprise modifying one or more operational settings of one or both of the first set of one or more sensors and the second set of one or more sensors.

13. The one or more non-transitory, machine-readable media as recited in claim 11, where the particularized specification of the one or more patterns of recognized activity mapped to the first location corresponds to a recognition of one or more of an individual, an object, or an aspect of the raised structure or of a premises on which the raised structure is located.

14. The one or more non-transitory, machine-readable media as recited in claim 11, the operations further comprising:

accessing a set of one or more identification rules specified by the particularized specification of the one or more patterns of recognized activity, the set of one or more identification rules comprising criteria for identifying sensed individuals, where the particularized specification of the one or more patterns of recognized activity mapped to the first location corresponds to a recognition of at least one individual and is mapped to an identifier of the at least one individual;

where the detecting the mismatch of the second sensor-based data with respect to the particularized specification of the one or more patterns of recognized activity mapped to the first location is based at least in part on analyzing the second sensor-based data using the identification rules to determine that the second sensor-based data corresponds to an insufficient identification of an individual.

15. The one or more non-transitory, machine-readable media as recited in claim 14, the operations further comprising:

causing storing of the particularized specification of the one or more patterns of recognized activity mapped to the first location and mapped to an identifier of the at least one individual.

16. A method for adaptive monitoring and authentication control for a premises on which a raised structure is located, the method comprising:

processing, by an adaptive control device, first sensor-based data received from a first set of one or more sensors comprising one or more image sensors, consequent to the first set of one or more sensors detecting phenomena on or around the raised structure, the first sensor-based data comprising image data corresponding to the detected phenomena;

adaptively developing, by the adaptive control device, a particularized specification of one or more patterns of recognized activity on or around the raised structure over time mapped to a first location based at least in part on recognition of an individual and/or an object from the image data, the particularized specification of the one or more patterns of recognized activity comprising one or more patterns of recognition corresponding to visual characteristics of a recognized individual and/or a recognized object over time, wherein the adaptively developing comprises detecting a plurality of environmental conditions, learning different reference images for different environmental conditions of the plurality of environmental conditions, and correlating the different reference images to recognize the individual and/or the object as a function of the different environmental conditions;

processing, by the adaptive control device, second sensor-based data that is based at least in part on the first set of one or more sensors, consequent to the first set of one or more sensors detecting additional phenomena corresponding to a second individual and/or a second object on or around the raised structure, the second sensor-based data comprising additional image data corresponding to the detected additional phenomena;

detecting, by the adaptive control device, a mismatch of the second sensor-based data, including the additional image data, with respect to the particularized specification of the one or more patterns of recognized activity mapped to the first location, including the one or more patterns of recognition; and consequent to the detection of the mismatch, selectively causing, by the adaptive control device, activation adjustments in cooperative operations of the first set of one or more sensors and a second set of one or more sensors communicatively coupled to the adaptive control device, and collecting subsequent sensor-based data to detect the second individual and/or the second object based at least in part on the activation adjustments and the cooperative operations of the first set of one or more sensors and the second set of one or more sensors.

17. The method for adaptive monitoring and authentication for a premises on which a raised structure is located as recited in claim 16, where the activation adjustments comprise modifying one or more operational settings of one or both of the first set of one or more sensors and the second set of one or more sensors.

18. The method for adaptive monitoring and authentication for a premises on which a raised structure is located as recited in claim 16, where the particularized specification of the one or more patterns of recognized activity mapped to the first location corresponds to a recognition of one or more of an individual, an object, or an aspect of the raised structure or of a premises on which the raised structure is located.

19. The method for adaptive monitoring and authentication for a premises on which a raised structure is located as recited in claim 16, the method further comprising:

accessing a set of one or more identification rules specified by the particularized specification of the one or more patterns of recognized activity stored by the adaptive control device, the set of one or more identification rules comprising criteria for identifying sensed individuals, where the particularized specification of the one or more patterns of recognized activity mapped to the first location corresponds to a recognition of at least one individual and is mapped to an identifier of the at least one individual;

where the detecting the mismatch of the second sensor-based data with respect to the particularized specification of the one or more patterns of recognized activity mapped to the first location is based at least in part on analyzing the second sensor-based data using the identification rules to determine that the second sensor-based data corresponds to an insufficient identification of an individual.

20. The method for adaptive monitoring and authentication for a premises on which a raised structure is located as recited in claim 19, the method further comprising:

storing the particularized specification of the one or more patterns of recognized activity mapped to the first location and mapped to an identifier of the at least one individual.

* * * * *